United States Patent
Lorgouilloux et al.

(10) Patent No.: US 9,738,772 B2
(45) Date of Patent: Aug. 22, 2017

(54) FLAME-RETARDANT AND FIRE-RESISTANT POLYMER COMPOSITIONS MADE FROM LIME

(71) Applicant: S. A. Lhoist Recherche et Developpement, Ottignies-Louvain-la-Neuve (BE)

(72) Inventors: Marion Lorgouilloux, Strepy Bracquegnies (BE); Didier Lesueur, Braine-le-Chateau (BE); Philippe Dubois, Braives (BE); Fouad Laoutid, Lambersart (FR); Leila Bonnaud, Valenciennes (FR)

(73) Assignee: S.A. Lhoist Recherche et Developpement, Ottignies-Louvain-la (BE)

( * ) Notice: Subject to any disclaimer, the term of this patent is extended or adjusted under 35 U.S.C. 154(b) by 0 days.

(21) Appl. No.: 14/406,936

(22) PCT Filed: Jul. 12, 2013

(86) PCT No.: PCT/EP2013/064790
§ 371 (c)(1),
(2) Date: Dec. 10, 2014

(87) PCT Pub. No.: WO2014/009525
PCT Pub. Date: Jan. 16, 2014

(65) Prior Publication Data
US 2015/0175770 A1    Jun. 25, 2015

Related U.S. Application Data

(60) Provisional application No. 61/696,941, filed on Sep. 5, 2012.

(30) Foreign Application Priority Data

Jul. 12, 2012  (BE) ................................... 2012/0484

(51) Int. Cl.
*C08K 3/22* (2006.01)
*C01B 31/00* (2006.01)
*C08K 3/26* (2006.01)
*C09K 21/02* (2006.01)
*C08K 3/00* (2006.01)

(52) U.S. Cl.
CPC .............. *C08K 3/22* (2013.01); *C01B 31/00* (2013.01); *C08K 3/0058* (2013.01); *C08K 3/26* (2013.01); *C09K 21/02* (2013.01); *C08K 2003/222* (2013.01); *C08K 2003/2206* (2013.01); *C08K 2003/2224* (2013.01); *C08K 2003/265* (2013.01); *Y10T 29/49995* (2015.01)

(58) Field of Classification Search
CPC .......... C08K 3/22; C08K 3/0058; C08K 3/26; C08K 2003/2206; C08K 2003/222; C08K 2003/2224; C08K 2003/265; C01B 31/00; C09K 21/02; Y10T 29/49995
USPC ........................................ 524/427, 436, 425
See application file for complete search history.

(56) References Cited

U.S. PATENT DOCUMENTS

2005/0113500 A1* 5/2005 Okoshi ................ C08K 3/0058
524/405
2006/0188428 A1* 8/2006 Wakabayashi ........... C08K 3/22
423/430

FOREIGN PATENT DOCUMENTS

DE       102009034700 A1 *  4/2010   ............. B82Y 30/00

OTHER PUBLICATIONS

Translation of DE102009034700A1 (2010).*

* cited by examiner

*Primary Examiner* — Kelechi Egwim
(74) *Attorney, Agent, or Firm* — Whitaker Chalk Swindle & Schwartz PLLC; Charles D. Gunter, Jr.

(57) ABSTRACT

A mineral filler in a flame-retardant organic polymer composition comprising a calcium compound for a fire-resistant effect characterized in that said calcium compound comprises at least calcium hydroxide, use of same and the combustion residue obtained therefrom, and polymer sheaths for electrical cables containing the mineral filler in the flame-retardant polymer composition.

17 Claims, 18 Drawing Sheets

FLAME-RETARDANT AND FIRE-RESISTANT POLYMER COMPOSITIONS MADE FROM LIME

The present invention relates to the field of mineral fillers to be added to polymers so as to form flame retardant polymer compositions. More particularly, the present invention relates to flame retardant and fire-resistant polymer compositions comprising a polymer and a mineral filler comprising a calcium compound.

From the document US2006/0188428, fillers derived from dolomite to be added to plastics are known for their antimicrobial capabilities and capacity to capture HCl during incineration of plastics.

Flame retardant additives (flame retardant being the accepted English term) or additive flame retardants or even simply flame retardants are incorporated into polymer matrices in order to slow or stop the combustion of the polymer in the case of a fire.

Known examples include for instance the document DE102009034700 which describes the use of dolomite compounds as flame retardants when added to polymer compositions.

Amongst other aspects, the effects of these flame retardant additives (called fillers in the following sections of this document), may be distinguished into two categories, namely, physical effects and chemical effects.

The chemical effects include acceleration of the rupture of the chains of the polymer under the effect of the temperature which results in a molten polymer that will drip and move out of the hot zone of the fire. In the case of systems based on phosphorous flame retardants, it is found that there is also the formation of a non cohesive layer of char resulting from reaction between the filler and the polymer, and this layer then acts as a barrier and prevents the release of combustible gases that feed the fire. Also, there are fillers, which, when the temperature rises, release non-flammable compounds or that scavenge the free radicals present in the gas phase. Some of these chemical effects are obtained by using halogenated fillers (bromides and chlorides) which are being progressively phased out for toxicological and environmental reasons.

Included amongst the noted physical effects is the reaction of endothermic decomposition of the filler which causes the cooling of the polymer and the release of inert gases such as steam or $CO_2$ which will then act as diluents of oxidising and combustible gases. Finally, there is also found to be the formation of a protective layer of low cohesion resulting from the degradation of the filler, which layer will again prevent the release of combustible gases. These physical effects are generally obtained with inorganic mineral fillers.

In a general sense, compositions comprising on the one hand, the mineral fillers and on the other hand, polymers must have certain characteristics, in practice, in order to be applicable. First of all, the flame retardant effect must have the ability to be quantified in order to assess the potential value of such compositions. The cone calorimeter standardised method (ISO 5660-1 or ASTM E 1354) is used to determine the heat release (denoted as HRR for Heat Release Rate and expressed in $kW/m^2$) of a polymer composition possibly containing mineral fillers, when the latter is exposed to a controlled level of radiant heat. This method, referred to hereinafter as "fire test" also provides the ability to determine the flammability, the loss in weight, the generation of smoke or even heat from the combustion of a composition. For a filled polymer, a low quantity of heat reflects a good level of flame retardancy of the mineral fillers.

There are other methods to assess flame retardancy properties such as LOI (Limiting Oxygen Index, in accordance with the standard ASTM D 2863), the test known as "the epiradiator" test (NF P92-505) or even methods, which generally correspond to specific applications of filled polymers (cables, electrical equipment, electrical accessories, etc) including therein the UL 94 flame tests, the various methods of the test known as "glow wire test" (IEC 60695-2), the cone calorimeter suitable for cables (EN 50399), etc.

Moreover, given the high proportion of these inorganic mineral fillers in the compositions, it is important to assess the impact that the mineral fillers have on the mechanical properties of polymer compositions. Therefore the filled polymers should exhibit characteristics of mechanical strength (tensile strength, impact) that are acceptable.

For a number of polymer matrices, the mechanical properties of the flame retardant polymer compositions by the addition of fillers can be improved by means of a surface treatment of the said fillers prior to their incorporation into the polymer matrix.

The inorganic mineral fillers that are most commonly used with polymers to obtain flame retardant properties are mainly aluminum trihydroxide $Al(OH)_3$, also known as ATH and magnesium dioxide $Mg(OH)_2$, also known as MDH.

Whereas these two hydroxides have effective flame retardant capacities because of their special properties which result in the physical effects listed here above, they however, have no effect on the cohesion of the combustion residue. Following their combustion, the polymer compositions filled with ATH or MDH are in the form of a non cohesive, black/grey ash (composed of magnesium oxide or aluminum oxide and the remainder of the carbonised polymer), which is reduced into dust under the slightest mechanical stress.

The calcium hydroxide, $Ca(OH)_2$, often obtained by hydration (slaking) of quicklime, decomposes in an endothermic manner (consumption of 900 kJ/kg) at around 400° C. releasing water and giving rise to the formation of an oxide, CaO. By virtue thereof $Ca(OH)_2$ thus appears to be an inorganic hydroxide having all the properties necessary so as to be used as a flame retardant filler. However, the temperature of decomposition of $Ca(OH)_2$ is high in comparison with those of ATH and MDH, and $Ca(OH)_2$ is thus effective as a flame retardant only at a relatively high temperature, with the risk being that at that temperature, the polymer is already fully degraded. Furthermore, on account of its strong basicity (pH of about 12.5), $Ca(OH)_2$ can be used as a filler only in polymer matrices whose properties are not degraded upon contact with particles having high pH.

$Ca(OH)_2$ is therefore less commonly used than ATH and MDH.

The document US2005/188428 discloses for example the use of aluminum trihydroxide, magnesium hydroxide and calcium dihydroxide as a flame retardant additive. This document focuses on the addition of fine particles that could enhance the flame retardancy and facilitate the incorporation and consumption of the mineral filler in the polymer.

The characterisation of combustion residues obtained after calcination of the filled polymer compositions, called carbonaceous residues in some cases, will make it possible to evaluate the usefulness of certain fillers in the polymer compositions in respect of certain applications.

The state of the combustion residue of polymer compositions has been vastly studied in recent years. It is indeed advantageous to have the polymer compositions which, in addition to being flame retardant, also retain their form during the fire. In particular, in the field of sheathing for electric cables made out of polymers, it is preferable, during the course of a fire, for the cable sheath to remain around the conductor cable in order to be able to ensure the continued functioning thereof and to thereby prevent short circuiting.

At the present time there does not exist any standard definition of the cohesion of combustion residues resulting from polymer compositions. Within the scope and meaning of the invention, the term "cohesive residue" is used to refer to a combustion residue that is not ash or dust or powder, but indeed a cohesive solid with a certain form unity (as opposed to a divided solid). This residue generally has the same overall 'form' and occupies the same place as the initial polymer composition from which it is derived. In particular, this residue may be porous due to which it may therefore be similar to an intumescent residue. When such a residue is obtained, the effect is referred to as fire resistance (fire resistant being the accepted English term), sometimes also known as ceramising effect. As mentioned here below, this cohesive residue is a residue that, after combustion in accordance with the standardised method of the cone calorimetry test as per ISO 5660-1 or ASTM E 1354, has only a very limited number of cracks passing across it, which is less than or equal to 3, preferably less than or equal to 2, or even to 1, and in a particularly preferable manner zero.

In an advantageous manner, this residue may, in addition to its cohesiveness, have a certain compressive mechanical strength, referred to in the following sections simply as "mechanical strength".

At the present time, it appears that the combination of a flame retardant and a fire-resistant effect leading to the formation of a cohesive residue, although very highly desired and appreciated is obtained only in the presence of complex formulations containing ATH or MDH as a flame retardant filler, combined with nanoparticles (clays, carbon nanotubes, silica, etc), zinc borate as fire resistant or ceramising agent. These ceramising agents are expensive, difficult to incorporate into the polymer and with respect to a significant number of them, they present an unfavourable ecotoxicity profile that limits the use thereof and makes it necessary to seek appropriate substitutes.

Calcium mineral fillers have already been described in the prior art. For example, the paper by Ashley et al, published in "Plastic, Rubber and Composites Processing and Application, vol 15, no 1, 1991", discloses a comparative study of various mineral fillers in an ethylene vinyl acetate (EVA), which is generally the reference polymer. This document discloses that although calcium hydroxide is potentially interesting on account of its endothermic decomposition, it however has a limited effect on the limiting oxygen index (LOI) of the EVA. However, a hard ash (referred to as 'strong ash' in the English terminology of the text) is formed during the use of $Ca(OH)_2$. This ash has been analysed and is mainly composed of calcium carbonate $CaCO_3$. This hard or strong ash obtained upon termination of the combustion is then presumed to be the result of the reaction between the calcium hydroxide and the $CO_2$ produced during the combustion.

These results, that is to say, a limited flame retardancy (on the LOI and on the ignition time) and the formation of a strong ash composed primarily of $CaCO_3$ have been confirmed in other polymer matrices. However, the reaction of carbonation of $Ca(OH)_2$ into $CaCO_3$ being exothermic, the authors have concluded that it is not appropriate to use $Ca(OH)_2$ as a flame retardant.

As for the paper by Focke et al, published in "*Journal of Chemical Engineering*, vol 9, no 2, 1997", it meanwhile evaluates various different inorganic mineral fillers as flame retardant. Several compounds have been compared, in particular an aluminum hydroxide, boric acid, a calcium hydroxide, a calcium sulfate, colemanite (calcium borate), a magnesium hydroxide, a zinc borate and a compound known as UltraGarb which is a mixture of huntite (having the formula $CaMg_3(CO_3)$) and finely divided hydromagnesite (having the formula $Mg_5(CO_3)_4(OH)_2 \cdot 4H_2O$).

Three parameters have been studied for each of these fillers: the cooling of the substrate (endothermic effect of the decomposition of the filler), the dilution of the combustion gases with inert gases (release of water and/or $CO_2$ by the filler) and the formation of a layer of 'char' (as per the English terminology, and 'ash-char barrier layer' in particular in this document).

Certain fillers that are very effective for the cooling and dilution of gases are, on the other hand, found to be unfavourable to the formation of the char layer. In fact, the oxides formed during the decomposition of the hydroxides catalyse the oxidation of the char layer, resulting in a lesser degree of charring for filled polymers than for unfilled polymers and thus limiting the barrier effect, which nevertheless enhances the flame retardant nature of the compositions.

Amongst the hydroxides that give rise to this phenomenon, calcium hydroxide is the one that leads to better charring, not from the oxidation being lower, but due to the formation of $CaCO_3$ by reaction of the CaO formed during the decomposition with the $CO_2$ formed during the combustion of the polymer. In the list of fillers tested only boric acid does not catalyse the oxidation of the char layer and leads to the formation of a cohesive char and a glassy residue. All of the other fillers lead to the formation of powdery residues.

$CaCO_3$ being considered a catalyst for the exothermic degradation of polyolefins, the carbonation of CaO during the use of $Ca(OH)_2$ as a filler may be viewed as a reaction that promotes combustion. The authors thus conclude that $Ca(OH)_2$ cannot therefore be used as a flame retardant.

Both these two documents disclose the formation of $CaCO_3$ during the combustion of polymer compositions filled with $Ca(OH)_2$. On account of this carbonation, they discourage the use of $Ca(OH)_2$ as a flame retardant filler, on the one hand, because the carbonation reaction is exothermic and on the other hand, because $CaCO_3$ is considered to be a catalyst for the reaction of degradation of polyolefins. In both these two cases, the combustion residue obtained in the presence of $Ca(OH)_2$ are not cohesive, but powdery, the very definition of ash being 'a powder resulting from the combustion of certain materials'.

The paper published in 2011 in Polymer Degradation and Stability by Hamdani-Devarennes et al, describes very clearly and in a detailed manner the interest in having a cohesive residue upon termination of the combustion of polymer compositions, particularly in the field of insulation for electrical cables. The system proposed by Hamdani-Devarennes et al for the formation of such a cohesive residue is a composition based on a silicone matrix and calcium fillers. Indeed, during the degradation of the polymer at high temperatures, there is a co-crystallisation in the solid phase between the CaO resulting from the decomposition of the filler and the silica from the matrix resulting in the formation of calcium silicate, most often wollastonite ($CaSiO_3$). Such residues can of course only be obtained in silicone matrices.

This co-crystallisation modifies the microstructure of the residue which is then denser, which explains its greater cohesion and in particular its enhanced compression strength as compared to residues obtained for the same silicone matrices filled with aluminum based additives, which systematically produce residues containing alumina ($Al_2O_3$) without reaction with the silicone matrix.

Amongst the calcium fillers, this document favours natural or synthetic carbonates (PCC) as compared to calcium hydroxides. In fact, whereas $Ca(OH)_2$ decomposes at a lower temperature than $CaCO_3$ and suddenly reacts more rapidly with the silica matrix, $Ca(OH)_2$ on the other hand, releases water during its decomposition which leads to the formation of a porous residue whose mechanical strength is logically lower than that of a dense residue.

The goal of the present invention is therefore to propose mineral fillers comprising at least one calcium compound in an organic polymer composition in order to benefit from its advantages in particular in terms of endothermicity (flame retardancy) while also providing for acceptable mechanical characteristics for the polymer composition containing the mineral filler and which in addition also enables the possibility of forming a cohesive combustion residue (effect of fire resistance), without requiring the use of expensive and difficult to incorporate ceramising agents.

To this end, the mineral filler according to the present invention, in order to obtain an effect of fire resistance, comprises of a calcium compound that contains at least calcium hydroxide.

It has in fact been confirmed that during the decomposition of the polymer matrix, the $CO_2$ released into the atmosphere from the zone of combustion is captured by the $Ca(OH)_2$ originally present in the filler of the composition according to invention. This capture results in the formation of calcium carbonate with the formula $CaCO_3$ as indicated by Ashley et al and Focke et al, in the documents previously cited above. However, in a surprising fashion, the aforementioned drawbacks of the formation of this $CaCO_3$ pointed out in these documents were reversed for the compositions according to the invention. In effect, during the study by cone calorimetry, the comparison of the results obtained for the compositions based on ATH or MDH on the one hand, and for compositions based on calcium hydroxide on the other hand, provides the means to conclude as to the good flame retardancy of calcium hydroxide.

In addition to the good flame retardancy of the calcium hydroxide based compositions, the use of calcium hydroxide in a flame retardant organic polymer composition provides the ability to obtain a further effect of fire resistance wherein the combustion residue obtained is cohesive. The formation of $CaCO_3$ during the combustion of flame retardant organic polymer compositions containing calcium hydroxide provides the ability to obtain at the end of combustion a cohesive residue which does not collapse in the form of ashes in contrast to the residue obtained at the end of combustion for the compositions based on ATH or MDH.

This calcium carbonate based combustion residue that is cohesive and possibly intumescent, which is obtained during the use of calcium hydroxide in flame retardant organic polymer compositions in contrast to the non cohesive combustion residues obtained with ATH or MDH, is particularly effective in certain applications, such as for example those pertaining to plastic parts used in the electrical or electronics fields (electrical or electronic equipment, electrical and/or communication cables, etc) in particular those for sheathed electrical cables wherein the cohesive residue would protect the electrical cables from damage caused by fire and short circuits by making it possible for the sheathing of the cable to continue to play its protective role even at high temperatures.

The capture by the calcium hydroxide of the $CO_2$ contained in the flue gas has a dual effect. On the one hand, it leads to the formation of a cohesive and possibly intumescent residue as previously described above. On the other hand, it shifts the equilibrium of combustion towards the formation of $CO_2$ at the expense of CO, reducing the toxicity of the fumes. This constitutes an additional positive effect linked to the presence of $Ca(OH)_2$ in the flame retardant polymer composition according to the invention.

The calcium hydroxide used within the scope and meaning of the present invention is in particular hydrated lime also known as slaked lime. This calcium compound is a generally powdery compound forming a mass of solid particles, mainly composed of calcium hydroxide $Ca(OH)_2$.

This slaked lime can obviously contain impurities, that is to say, the phases derived from $SiO_2$, $Al_2O$, $Fe_2O_3$, MnO, $P_2O_5$, $K_2O$ and/or $SO_3$ up to a few tens of grammes per kilogramme. Nevertheless, the amount of these impurities, expressed in the form of the oxides listed above, does not exceed 5%, preferably 3%, preferably 2% or even 1% of the weight of the mineral filler according to the invention. In particular, the slaked lime advantageously contains less than 1.0% by weight of $Fe_2O_3$, preferably less than 0.5% and preferably less than 0.3%, in a manner so as not to significantly change the colour of the flame retardant polymer composition.

This slaked lime may also contain calcium oxide which was not hydrated during the preparation of slaked lime according to the invention, as it may contain calcium carbonate $CaCO_3$. This calcium carbonate may originate from either the initial limestone from which is derived the slaked lime according to the invention (unburnt), or from a reaction of partial carbonation of the slaked lime upon contact with air. The content of calcium oxide in the slaked lime according to the invention is generally less than 3% by weight, preferably less than 2% and in an advantageous manner less than 1%. The calcium carbonate content is less than 15% weight, preferably less than 10% and in an advantageous manner less than 6%, in an even more advantageous manner less than 4%. The slaked lime may contain free water, that is, not chemically bound to the compound, up to about 50 g/kg.

In a general manner, the size of the particles of this slaked lime in powdery form is entirely less than 1 mm and often less than 250 µm.

In particular, when the size of the particles is measured by means of laser granulometry (after dispersion of the product in methanol without the step of deagglomeration by ultrasound), the $d_{90}$, which corresponds to the diameter (in µm) for which 90% by volume of the particles of the powdery material are smaller, is preferably less than or equal to 100 µm, in particular less than or equal to 60 µm, advantageously less than or equal to 30 µm and in particular less than or equal to 10 µm. Similarly, the $d_{97}$, which corresponds to the diameter (µm) for which 97% by volume of the particles of the powdery material are smaller, is preferably less than or equal to 200 µm, advantageously less than or equal to 100 µm and in particular less than or equal to 50 µm. The smaller the particles are, the better dispersed they will be in the polymer matrix.

A slaked lime according to the invention can be obtained by conventional methods of hydration of quicklime, that is either with an excess of water resulting in the formation of a suspension (milk of lime as per the English terminology)

or a paste (lime putty as per the English terminology), or in a dry process in order to obtain, directly upon conclusion of the hydration a dry powder containing less than 50 g/kg of free water. In the case of hydrations with excess water (milk or paste), the wet product should be filtered, dried and deagglomerated in order to obtain the hydrated lime according to the invention.

Advantageously, the said inorganic mineral filler of the flame retardant polymer composition in addition comprises at least one magnesium compound, in the form of a magnesium hydroxide by way of a flame retardant additive.

In a particular embodiment, the calcium compound and the magnesium compound of the said mineral filler of the flame retardant polymer composition are two separate compounds in the mixture.

In one embodiment of the invention, the calcium compound and the magnesium compound of the said mineral filler of the flame retardant polymer composition are tightly bound and derived from a slaking of quicklime with a suspension of magnesium hydroxide.

In such a case, the magnesium hydroxide coming from the lime slaking suspension or slurry is incorporated into the solid phase of the calcium hydroxide particles. If MgO is still present at the conclusion of the slaking of quicklime by a suspension of magnesium hydroxide, it will be present in an amount of less than 2%, since it is then a phase of impurities.

In an advantageous manner, the calcium compound and the magnesium compound of the said mineral filler of the flame retardant polymer composition are tightly bound and derived from a total or partial slaking of dolomite lime.

The said inorganic mineral filler in which the calcium compound is tightly bound to the magnesium compound provides the ability to ensure homogeneity in the properties of fire resistance and flame retardancy of the flame retardant polymer composition of the invention.

Preferably, the said mineral filler comprising a calcium compound and a magnesium compound that are tightly bound form a semi hydrated dolomite having the general formula $aCaCO_3.bCa(OH)_2.cMg(OH)_2.dMgO.eCaO$, a, b, c, d and e being mole fractions with $(a+b+e)/(c+d)$ being comprised between 0.8 and 1.2, and having values such that:
- b represents the mole fraction corresponding to a proportion by weight that is greater than or equal to 15% and less than or equal to 69%, in particular from 30% to 65%, preferably 40 to 60% and in a particularly advantageous manner from 45% to 55%.
- c represents the mole fraction corresponding to a proportion by weight that is greater than or equal to 1%, in particular from 2% to 51%, preferably from 3% to 40%, in particular from 6% to 30%, preferably from 8% to 25%, and in a particularly advantageous manner from 10% to 20%,
- d represents the mole fraction corresponding to a proportion by weight that is greater than or equal to 1%, preferably greater than 5%, advantageously greater than 10% and particularly preferably greater than 15%, in particular greater than 20% and generally less than 41%, in particular less than 30%,
- a represents the mole fraction corresponding to a proportion by weight that is greater than or equal to 0%, preferably from 1% to 20%, preferably less than 18%, in particular less than 10%, preferably less than 8%, and in a particularly advantageous manner less than 6%,
- e represents the mole fraction corresponding to a proportion by weight that is greater than or equal to 0% and less than 15%, preferably less than 10%, in particular less than 5%, preferably less than 3% and in a particularly advantageous manner less than 2%.

Advantageously, the said semi-hydrated dolomite comprises agglomerates of aggregates of particles.

In particular, the said inorganic mineral filler comprising a calcium compound and a magnesium compound that are tightly bound form a fully hydrated dolomite having the general formula $aCaCO_3.bCa(OH)_2.cMg(OH)_2.dMgO.eCaO$, a, b, c, d and e being mole fractions with $(a+b+e)/(c+d)$ being comprised between 0.8 and 1.2, and having values such that:
- b represents the mole fraction corresponding to a proportion by weight of 45% to 57%, preferably greater than 50%,
- c represents the mole fraction corresponding to a proportion by weight of 35% to 42%, preferably greater than 37%,
- d represents the mole fraction corresponding to a proportion by weight of 0% to 2%, preferably less than 1%,
- a represents the mole fraction corresponding to a proportion by weight that is greater than or equal to 0%, in particular from 1% to 10%, preferably less than 5%,
- e represents the mole fraction corresponding to a proportion by weight of 0% to 3%, preferably less than 1%.

Advantageously, the said fully hydrated dolomite comprises agglomerates of aggregates of particles.

Furthermore, in addition to $CaCO_3$, $Ca(OH)_2$, $Mg(OH)_2$, MgO and CaO, the semi or fully hydrated dolomites of the composition according to the invention may contain the impurities usually present in natural dolomites, that is to say, derived phases from the $SiO_2$, $Al_2O$, $Fe_2O$, MnO, $P_2O_5$, $K_2O$ and/or $SO_3$, but the amount of these impurities, expressed in the form of the oxides listed above, does not exceed 5%, preferably 3%, preferably 2% or even 1% of the weight of the semi-hydrated dolomite. In particular, the filler of the composition according to the invention advantageously contains less than 1.0% by weight of $Fe_2O_3$, preferably less than 0.7% and preferably less than 0.5%, in a manner so as not to significantly change the colour of the flame retardant polymer composition.

The hydrated dolomites may contain free water, that is, not chemically bound to the compound, up to about 50 g/kg.

In a general manner, the size of the particles of this dolomite in powdery form is entirely less than 1 mm and often less than 250 μm.

In particular, when the size of the particles is measured by means of laser granulometry (after dispersion of the product in methanol without the step of deagglomeration by ultrasound), the $d_{90}$, which corresponds to the diameter (in μm) for which 90% by volume of the particles of the powdery material are smaller, is preferably less than or equal to 60 μm, advantageously less than or equal to 30 μm and in particular less than or equal to 10 μm. Similarly, the $d_{97}$, which corresponds to the diameter (μm) for which 97% by volume of the particles of the powdery material are smaller, is preferably less than or equal to 200 μm, advantageously less than or equal to 100 μm and in particular less than or equal to 50 μm. The smaller the particles are, the better dispersed they will be in the polymer matrix.

The semi or fully hydrated dolomites are obtained by conventional methods of hydration of dolomites, that is either with an excess of water resulting in the formation of a suspension (milk of dolomite) or a paste, or in a dry process in order to obtain, directly upon conclusion of the hydration a dry powder containing less than 50 g/kg of free water. In the case of hydrations with excess water (milk or paste), the wet product should be filtered, dried and deagglomerated in order to obtain the hydrated dolomite according to the invention. In the case of hydrations with a dry process, a hydration at atmospheric pressure results in the production of semi-hydrated dolomite while obtaining a fully hydrated dolomite requires a process of hydration under pressure.

Other embodiments of the mineral filler in a flame retardant organic polymer composition comprising a calcium compound so as to ensure an effect of fire resistance according to the invention are indicated in the appended claims.

The present invention also relates to the use of a mineral filler containing calcium hydroxide by way of a fire resistance additive in a flame retardant organic polymer composition.

The organic polymer of the composition may be of thermoplastic, thermosetting or elastomer type, of natural or synthetic origin. It may be selected from the group consisting of polyethylenes, polypropylenes, polystyrenes, copolymers of ethylene and propylene (EPR), terpolymers of ethylene-propylene-diene-monomer (EPDM), copolymers of ethylene and vinyl acetate (EVA) having low/medium acetate content, copolymers of ethylene and methyl acrylate (EMA) having low/medium acrylate content, copolymers of ethylene and ethyl acrylate (EEA) having low acrylate content, copolymers of ethylene and butyl acrylate (EBA) having low acrylate content, copolymers of ethylene and octane, ethylene based polymers, polypropylene based polymers, polystyrene based polymers, halogenated polymers, or any mixture of these compounds.

Preferably, in the use according to the present invention, the mineral filler is incorporated into the flame retardant polymer composition in an amount of 1% to 80% by weight, preferably from 40% to 75% by weight, in relation to the total weight of the said flame retardant polymer composition.

In the use according to the present invention, the mineral filler is a mineral filler as described here above. It is understood that a mineral filler according to the present invention may be combined with conventional flame retardants such as ATH or MDH or similar types.

Other forms of use of the mineral filler are indicated in the appended claims.

The present invention also relates to a method for manufacturing a flame retardant polymer composition comprising the following steps of:

a) mixing of at least two granular polymers in order to form a first mixture of granular polymers, in the dry state in a first mixing vessel;

b) feeding of the said granular mixture into a mixing vessel;

c) feeding of at least one mineral filler according to the present invention, into the said mixing vessel accompanied by the formation of a second mixture;

d) melting of the said second mixture in order to form the said flame retardant polymer composition in the molten state, and feeding of the said flame retardant polymer composition in the molten state through an extrusion die in order to form wires of extrudated flame retardant polymer composition; and e) cutting of the said wires of extrudated flame retardant polymer composition according to a predetermined size in order to form solid granules (also known as compounds) of flame retardant polymer composition.

Advantageously, in the method according to the invention, at least one of the said at least two polymers is selected from the group consisting of polyethylenes, polypropylenes, polystyrenes, copolymers of ethylene and propylene (EPR), terpolymers of ethylene-propylene-diene-monomer (EPDM), copolymers of ethylene and vinyl acetate (EVA) having low/medium acetate content, copolymers of ethylene and methyl acrylate (EMA) having low/medium acrylate content, copolymers of ethylene and ethyl acrylate (EEA) having low acrylate content, copolymers of ethylene and butyl acrylate (EBA) having low acrylate content, copolymers of ethylene and octane, ethylene based polymers, polypropylene based polymers, polystyrene based polymers, halogenated polymers, or any mixture of these compounds.

In a preferred embodiment of the method according to the invention, the mineral filler is incorporated into the flame retardant polymer composition in an amount of 1% to 80% by weight, advantageously from 40% to 75% by weight, in relation to the total weight of the said flame retardant polymer composition.

Other embodiments of the method according to the invention are mentioned in the appended claims.

The present invention also relates to a polymer sheath for electrical cables characterised in that it contains by way of a fire resistance additive a calcium hydroxide as a mineral filler for a flame retardant organic polymer composition.

Preferably, the said flame retardant organic polymer composition comprises a thermoplastic, thermosetting or elastomer type of polymer of natural or synthetic origin, preferably selected from the group consisting of polyethylenes, polypropylenes, polystyrenes, copolymers of ethylene and propylene (EPR), terpolymers of ethylene-propylene-diene-monomer (EPDM), copolymers of ethylene and vinyl acetate (EVA) having low/medium acetate content, copolymers of ethylene and methyl acrylate (EMA) having low/medium acrylate content, copolymers of ethylene and ethyl acrylate (EEA) having low acrylate content, copolymers of ethylene and butyl acrylate (EBA) having low acrylate content, copolymers of ethylene and octane, ethylene based polymers, polypropylene based polymers, polystyrene based polymers, halogenated polymers, or any mixture of these compounds.

Advantageously, the said polymer sheath comprises a mineral filler according to the invention, as mentioned here above.

The invention finally relates to a combustion residue of a flame retardant polymer composition comprising a mineral filler according to the invention, characterised in that the residue is a cohesive residue having an average compressive mechanical breaking strength which is greater than 3 kPa, preferably greater than 8 kPa, in a preferential manner greater than 20 kPa, and in a particularly advantageous manner greater than 60 kPa.

Advantageously, this cohesive combustion residue is a residue that has only a very limited number of cracks passing across it, which is less than or equal to 3, preferably less than or equal to 2, or even to 1, and in a particularly preferable manner zero, after combustion in accordance with the standardised method of the cone calorimetry test as per ISO 5660-1 or ASTM E 1354.

Preferably, the combustion residue, after combustion in accordance with the standardised method of the cone calorimetry test as per ISO 5660-1 or ASTM E 1354, has a maximum size of combustion residue whose cross section is similar to a square which can be taken without being broken in the said residue obtained that is greater than or equal to 10 mm, preferably greater than or equal to 30 mm, preferably greater than or equal to 50 mm, from a sample prior to combustion having a square cross section with sides measuring 100 mm.

Other embodiments of the combustion residue based on the invention are indicated in the appended claims.

Other characteristics, details and advantages of the invention will become apparent from the description given hereinafter, purely by way of non limiting example and with reference made to the accompanying drawings and examples.

Table 1 summarises together the main characteristics of the hydrated limes and dolomites used in the examples. The notation dx represents a diameter, expressed as µm, relative to which X % of the particles measured are smaller.

Table 2 provides the properties of ATH and MDH that are used as the reference fillers.

Table 3 summarises together the set of values that are used to characterise the combustion residues obtained at the end of the cone calorimetry test for the different compositions tested in the examples.

It is important to note that, in the tables here below two measurements of particle size have been shown. The measurement of particle size 1 is performed one by simply placing the filler in methanol without any deagglomeration step. The results of this measurement then correspond to the sizes of agglomerates. With respect to the method of particle size measurement 2 it is carried out after deagglomeration of the filler by means of ultrasound, and the values determined by this method are more rather akin to the size of the individual particles. In the description of the invention, the examples or even in the claims, for the purposes of simplification, the only values taken into account are the values determined by the method 1, that is to say the sizes of agglomerates.

In the figures, elements that are identical or similar bear the same reference numerals.

Figure 1:
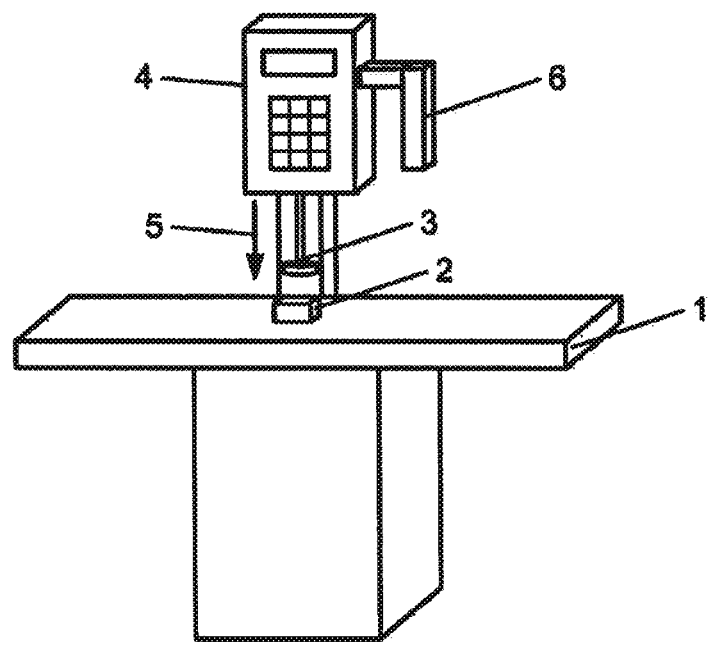
FIG. 1 is a schematic illustration of the measurement device for measuring the compressive mechanical strength of the combustion residues.

The present invention therefore relates to a flame retardant and fire resistant polymer composition comprising a polymer and a mineral filler which contains at least one calcium compound in the form of calcium hydroxide.

The mineral filler may also include a magnesium compound. This magnesium compound may be added into the admixture or be tightly bound to the calcium compound by carrying out a partial or total slaking of the dolomite lime.

These flame retardant polymer compositions have the extremely advantageous characteristic of providing at the conclusion of the combustion a cohesive residue that, in addition to a flame retarding effect ("flame retardant" as per the English terminology) confers the filler with an effect of resistance to fire ("fire resistant" as per the English terminology), sometimes also referred to as "ceramising" effect.

At the current time no standard tests are available for the measurement of cohesion of the combustion residues of the polymer compositions. At the initial stage, the cohesion of the residue can be assessed qualitatively by means of simple observation of a residue obtained at the end of the cone calorimetry test. During this observation, however, some quantitative data may be estimated: i) the number of cracks passing across the residue (transverse cracks), ii) the depth of these cracks (that is to say only whether the cracks are only present at the surface or if they pass through the entire thickness of the combustion residue), iii) the cohesiveness may also be represented by the maximum size of the sample (the sample making up the entire thickness of the residue and whose cross section is similar to a square) which may be taken without being broken in the residue obtained at the conclusion of the cone calorimeter test (which has a square cross section with sides measuring 100 mm).

Pursuant to the scope and meaning of the invention, the term "transverse crack" refers to a crack that passes across from one side of the combustion residue to the other which is obtained at the conclusion of the cone calorimetry test and which is present in the form of a sample having a square cross section with sides measuring 100 mm.

In order to ensure the cohesion of the residue, as well as being present in limited numbers, these transverse cracks must also be quite shallow, that is to say, that they should not be passing through the entire thickness of the residue.

Any residue having 1 to 10 deep crack(s) is considered to be moderately cohesive.

Any residue having more than 10 deep cracks is considered not to be cohesive.

Any combustion residue will be considered to be cohesive where it has only a very limited number of cracks passing across it, which is less than or equal to 3, preferably less than or equal to 2, or even to 1, and in a particularly preferable manner zero, after combustion in accordance with the standardised method of the cone calorimetry test as per ISO 5660-1 or ASTM E 1354.

Now considering the maximum size of the sample (side of the sample making up the entire thickness of the residue and whose cross section is similar to a square), which can be taken without being broken in the said residue obtained after conclusion of the cone calorimetry test (which itself has a square cross section with sides measuring 100 mm), the residue is said to be cohesive if this said size is greater than or equal to 10 mm, preferably greater than or equal to 30 mm, preferably greater than or equal to 50 mm.

Furthermore, a quantitative method has been developed in the context of this invention in order to determine the mechanical strength of the combustion residues. This method is only applicable for combustion residues in which it is possible to take a sample whereof the cross section is similar to a square with sides measuring at least 100 mm, that is to say, whereof the cross section is at least as large as the surface of the movable platen used for this measurement.

It consists of performing a measurement of the compressive strength by means of using a texturometer-Chatillon digital force gauge (DFGS 50 model), on three samples of a combustion residue. These three samples are taken from different locations in the residue having a square cross section with sides measuring 100 mm obtained upon completion of cone calorimetry measurements. The principle of this method is illustrated in FIG. 1. Each sample 2 is placed at the centre of a fixed rectangular metal plate 1 measuring approximately 100 mm×200 mm. Manually, a second metal plate 3, this time very considerably smaller and circular (12 mm in diameter) is brought by means of a lever 6 that makes it possible to manually cause the lowering of the movable platen, to be in contact with the sample 2. This second plate 3 being connected to a force gauge 4, the force applied, arrow 5, on the sample by the movable platen at the time of complete rupture of the sample can be determined. The useful value is the average of the breaking strength values measured for the three samples of a combustion residue. The measured strength is expressed in Newtons (N), but may be normalised by the surface of the circular movable platen in order to determine the compressive mechanical strength of the residue in Pascal (Pa). Quite obviously, the samples used for this measurement should have a cross section that is at least as large as the surface of the circular movable platen, such that the force is applied over the entire surface of this platen.

This method does not allow for the determination of a single criterion and its outcome depends on antagonistic effects. Indeed, the higher the porosity of the residue, for example as a result of phenomena similar to intumescence, the lower its compressive strength will be, although its cohesiveness could be very good. Conversely, a residue with low porosity may exhibit poor cohesiveness and a high degree of cracking, while each sample of this residue may have a high mechanical strength.

EXAMPLES

Example 1

Use as a Flame Retardant Filler for a Hydrated Lime with Fine Particle Size Grade in an EVA Polymer Composition A hydrated lime was obtained in an industrial process by means of calcination of a natural limestone, and followed by hydration (slaking) via a dry process, in an industrial hydrator, of the quicklime obtained after calcination. The slaked lime produced thus has a moisture content lower than 2% by weight and is in powdery form. It is then subjected to an industrial particle size (granulometric) separation step that is used so as to remove the coarser particles. At the conclusion of this industrial manufacturing process, the slaked lime is once again separated by means of various different steps of separation by air flotation, this time using laboratory scale means and processes, in order to obtain a fine particle size grade, called particle size (granulometric) grade A. The properties of this grade A hydrated lime are summarised together in the Table 1.

This filler is incorporated in an amount representing up to 60% by weight in a matrix of co-polymer of ethylene and vinyl acetate containing 28% of vinyl acetate (EVA 328, Escorene UL328, produced by ExxonMobil Chemical). The mixing between the polymer matrix and the mineral filler is performed by making use of a twin-screw extruder. Plates, prepared with a hydraulic press, measuring 100×100×4 mm$^3$ were then subjected to the fire test by cone calorimetry. The residues obtained at the conclusion of the cone calorimeter test (combustion residues) are at the initial stage observed and photographed in order to assess the degree of cohesion thereof, and then the compressive mechanical strength thereof is characterised by carrying out the method previously described above in the text and illustrated in FIG. 1.

Figure 2:
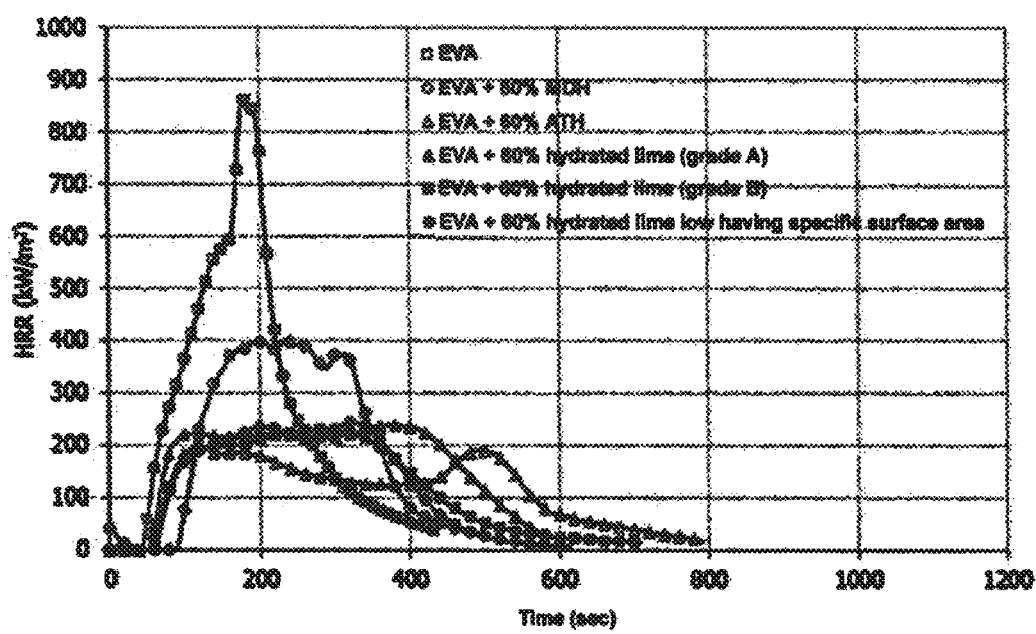
FIG. 2 is a graph illustrating the results of the fire test by means of cone calorimetry of the flame retardant polymer compositions according to the Examples 1 to 3.

The results of the fire tests by cone calorimetry are shown in FIG. 2. They are compared to those obtained for the host polymer that is unfilled (EVA) and for the same polymer, filled under the same conditions and with the same proportions of ATH (Martinal OL 107 LEO-Albemarle, described in Table 2) and MDH (Magnin H10-Albemarle, described in Table 2).

The cone calorimetry tests carried out for this composition show clearly that the incorporation of 60% of this grade A hydrated lime in the EVA matrix significantly reduces the energy released during the combustion of the polymer (the maximum of the HRR curve is significantly lower in comparison to the unfilled EVA). This reduction is comparable to that measured for the EVA composition containing ATH. It is moreover also more significant than that measured for the EVA composition containing MDH. On the other hand, the release of heat is spread out over a longer period of time than for the unfilled EVA, which makes it possible to avoid the hot spots which are the root cause of the propagation of the fire spreading from one room to the other.

Figure 3A:
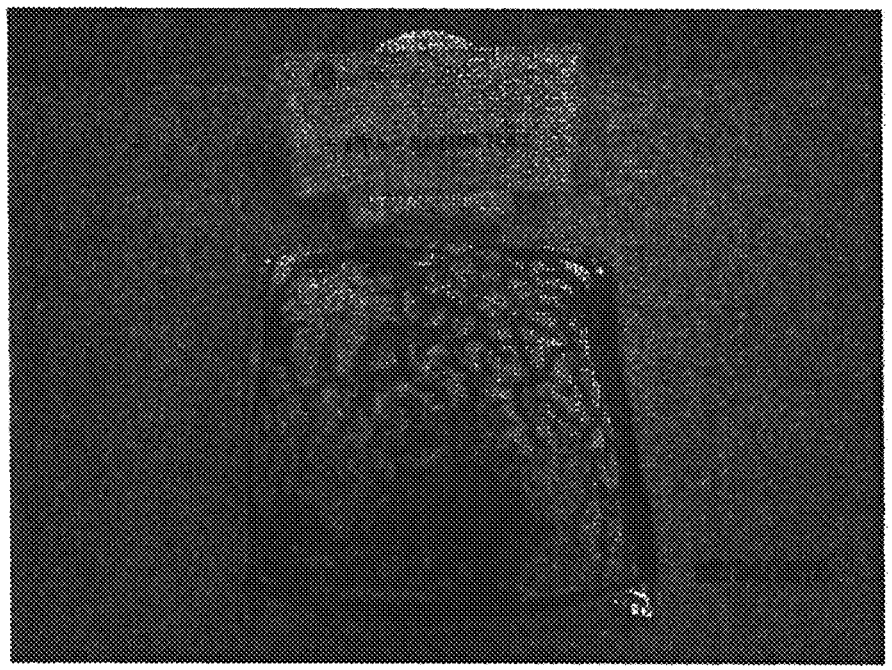
FIGS. 3A and 3B are photographs of the combustion residue of the flame retardant polymer composition according to the Example 1.
Figure 3B:

The observation of combustion residues shown in the FIGS. 3A and 3B and characterised in the Table 3 makes it possible to conclude that following conclusion of the combustion thereof, the composition of this example led to the formation of a cohesive residue this residue is composed of a single layer and not a powder, ash or any other divided material. This residue therefore has an appearance that is totally different from that of the residues obtained for the ATH based or MDH based compositions, which are in the form of powder or ash (FIGS. 16A and 16B in the case of MDH and FIGS. 17A and 17B in the case of ATH). The layer of the residue of this example is 'swollen' (FIG. 3B). The residue does not contain any transverse cracks, but rather, only cracks that are shorter and which are not deep cracks, but only surface cracks. The measurement of the compressive strength of the residue resulted in an average value (based on 3 measurements performed with the equipment shown in FIG. 1 on the samples taken from different locations in the combustion residue) of 125 kPa, with the three measured values being 111 kPa, 122 kPa and 143 kPa (Table 3).

Example 2

Use as a Flame Retardant Filler for a Hydrated Lime with Coarser Particle Size Grade in an EVA Composition The mineral filler used in Example 2 has the same origin as the hydrated lime used in Example 1 and it is therefore similar thereto, with the only difference being the size of its particles. Indeed, the steps of separation by air flotation implemented using laboratory scale means and processes for the grade A hydrated lime of Example 1 were carried out under different conditions, with a coarser cut size, in order to obtain hydrated lime having grade B particle size which is coarser than the grade A size. The properties of the grade B hydrated lime are summarised in Table 1. The particle size involved here corresponds to the measurement of the particle size shown in Table 1 here below, that is to say the measurement performed by means of laser granulometry on the powder dispersed in methanol and not deagglomerated and representating the size of the agglomerates. The polymer matrix is once again EVA 328.

The results of the fire test by cone calorimetry recorded for this composition are shown in FIG. 2, and indicate a level of flame retardancy effect that is very much similar to that obtained for the particle size (granulometric) grade A hydrated lime of Example 1, despite there however, being a shorter duration of effectiveness.

Figure 4A:
FIGS. 4A and 4B are photographs of the combustion residue of the flame retardant polymer composition according to the Example 2.
Figure 4B:
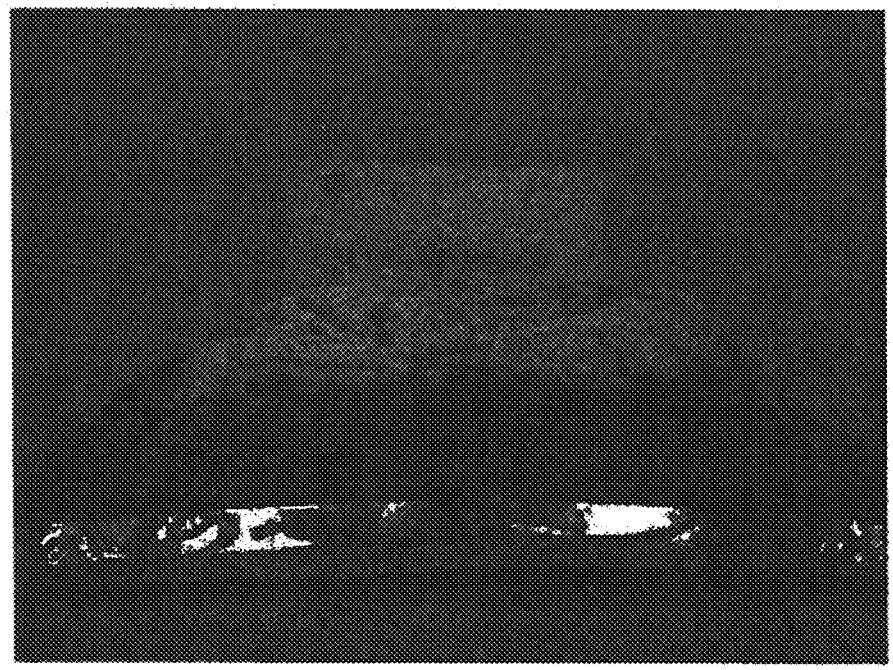

The residues obtained at the conclusion of the cone calorimeter test (combustion residues), have been characterised in the same manner as in the Example 1. The observation of these residues shown in the FIGS. 4A and 4B and characterised in Table 3 provides the data to conclude that upon conclusion of combustion thereof, the composition used in this example led to the formation of a cohesive residue comparable to that obtained from the composition used in Example 1. The measurement of the mechanical strength of the residue resulted in an average value (based on measurements performed on three samples taken from different locations in the combustion residue) of 134 kPa, the three measured values being 120 kPa, 125 kPa and 157 kPa, Example 3

Use as a Flame Retardant Filler for a Hydrated Lime with Low Specific Surface Area in an EVA Polymer Composition This example is similar to Example 2, with the only exception that the standard hydrated lime in Example 2 has been replaced by a hydrated lime having a lower specific surface area. This hydrated lime having a low specific surface area is industrially synthesised with a process similar to the method used for the production of standard hydrated lime, but by adding during the course of the synthesis an additive that accelerates the kinetics of hydration of the quicklime, resulting in the closure of porosity and thus preventing the development of the specific surface area of the hydrated lime. The main characteristics of the hydrated lime used in this example are summarised in the Table 1.

Figure 5A:
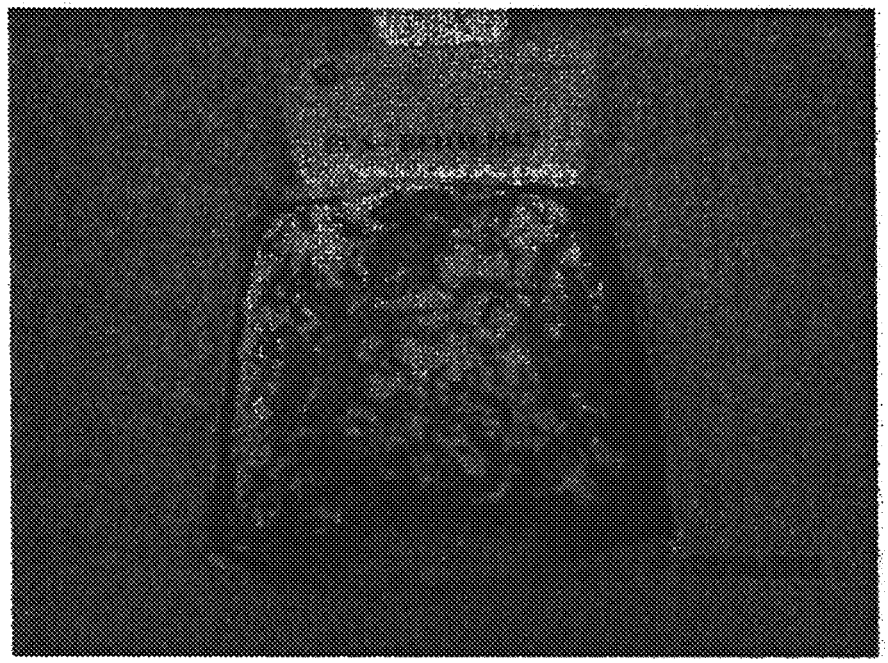
FIGS. 5A and 5B are photographs of the combustion residue of the flame retardant polymer composition according to the Example 3.
Figure 5B:

The results of the fire tests by cone calorimetry are shown in FIG. 2 and are very much comparable to those obtained for the composition used in Example 2. The residues obtained upon conclusion of combustion of the composition of this example are presented in the FIGS. 5A and 5B. These photographs provide evidence of the formation of a cohesive residue upon conclusion of combustion of the composition used in this example, this residue containing no transverse cracks and no deep cracks. The compressive strength measured as in the previous examples is 26, 33 and 37 kPa respectively over the three samples taken from the cohesive residue, which is an average of 32 kPa.

Example 4

Use as a Flame Retardant Filler for a Fine Particle Size Grade of Hydrated Lime in a Polystyrene Polymer Composition Example 4 is similar to Example 1 in that the mineral filler is still for the grade A particle size hydrated lime presented in Table 1, but the polymer matrix this time is of polystyrene (PS, Polystyrol VPT0013 GR2). The level of filler content in the matrix is 50% by weight.

Figure 6:
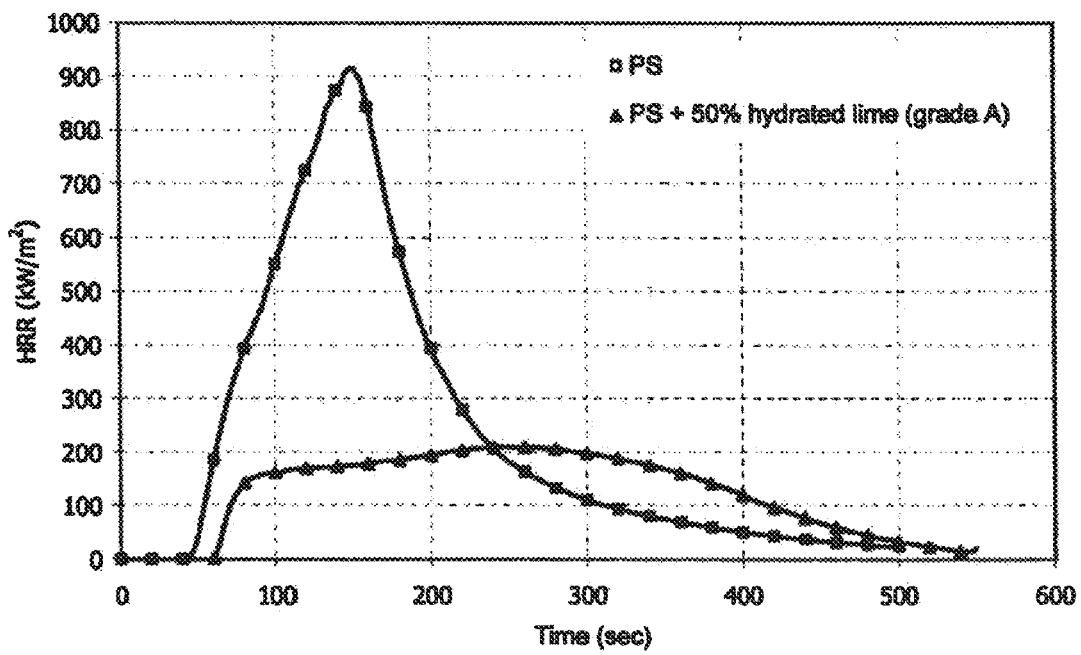
FIG. 6 is a graph illustrating the results of the fire test by means of cone calorimetry of the flame retardant polymer composition according to the Example 4.

The results of the fire tests by cone calorimetry recorded for this composition are shown in FIG. 6. They have been compared to the results obtained for the unfilled polymer B (PS) and indicate, once again, a very significant level of flame retardancy for the hydrated lime. The residues at the conclusion of the cone calorimeter test (combustion residues), have been characterised in the same manner as in the Example 1.

Figure 7A:
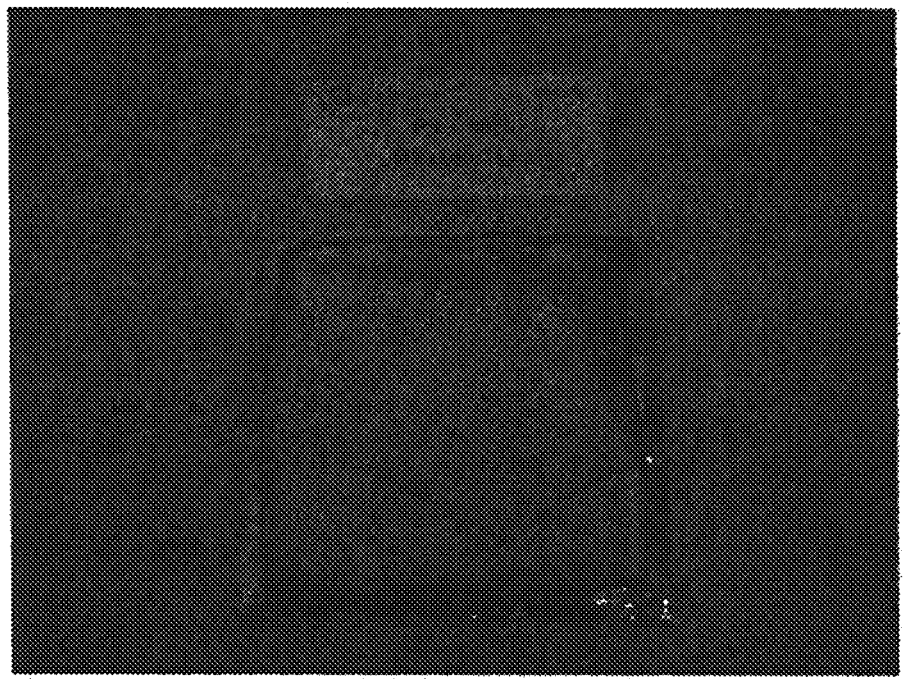
FIGS. 7A and 7B are photographs of the combustion residue of the flame retardant polymer composition according to the Example 4.
Figure 7B:
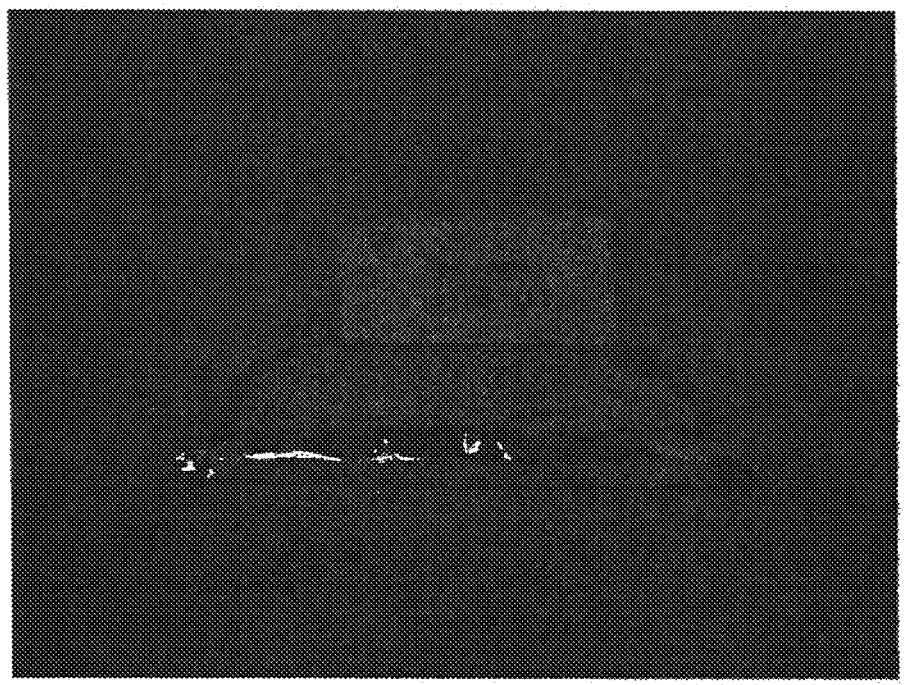

The observation of these combustion residues shown in the FIGS. 7A and 7B and characterised in Table 3 provides the data to conclude that upon conclusion of combustion thereof, the composition used in this example led to the formation of a moderately cohesive residue: unlike the residues obtained from the polystyrene compositions filled with ATH or MDH, which are presented in the form of powder or ash (FIGS. 20A and 20B in the case of MDH and FIGS. 21 A and 21 B in the case of ATH), the residue obtained with the composition in this example is composed of a cohesive layer even if this layer is cracked in several places. The residue includes 2 deep transverse cracks. Despite this cracking, a sample of the cross section similar to a square with sides measuring about 30 mm can be withdrawn from the entire thickness of this residue. Moreover, the measurement of the mechanical strength of the residue resulted in an average value (based on measurements performed on three samples taken from different locations in the combustion residue) of 98 kPa, the three measured values being 67 kPa, 105 kPa and 123 kPa. If the cohesion of the combustion residue is not as good for this composition than for the composition used in Example 1 detailed above and composed of the same mineral filler but a different polymer matrix, the mechanical strength is however entirely satisfactory for the residue of the composition of this example.

Example 5

Use as a Flame Retardant Filler for a Fine Particle Size Grade Hydrated Lime, that has been Surface Treated, in a Polymer Composition of MDPE

The flame retardant filler used in the composition of this example is obtained by surface treating calcium stearate with a standard hydrated lime. For this, a hydrated lime that is very much comparable to the one used in Example 1 (of the same origin and the same particle size grade) is selected, then 2 kg of lime are placed in a Lodige brand horizontal blade mixer with a total capacity of 20 L (M20), preheated to 60° C. Calcium stearate is then added to this mixer in an amount of up to 4% by weight of the hydrated lime (that is 80 g of calcium stearate). The stirring in the mixer is started and then the mixture is heated to 200° C. (it takes about 17 minutes of heating so as to raise the temperature of the mixture from 60° C. to 200° C.). When this temperature of 200° C. is reached, the mixing is continued for 10 minutes at 200° C., before being stopped, then the product is allowed to stand until it is completely cooled.

This surface treated filler is then incorporated in an amount representing up to 50% by weight in a matrix of medium density polyethylene (MDPE 3802, cable grade produced by Total). The incorporation of the filler in this matrix is carried out with a Brabender type mixer. The plates measuring 100×100×4 mm$^3$ that are used for the fire test by cone calorimetry were prepared with a hydraulic press.

Again, the combustion residues obtained at the conclusion of the cone calorimeter test of the samples of the composition used in this Example were characterised.

Figure 8:
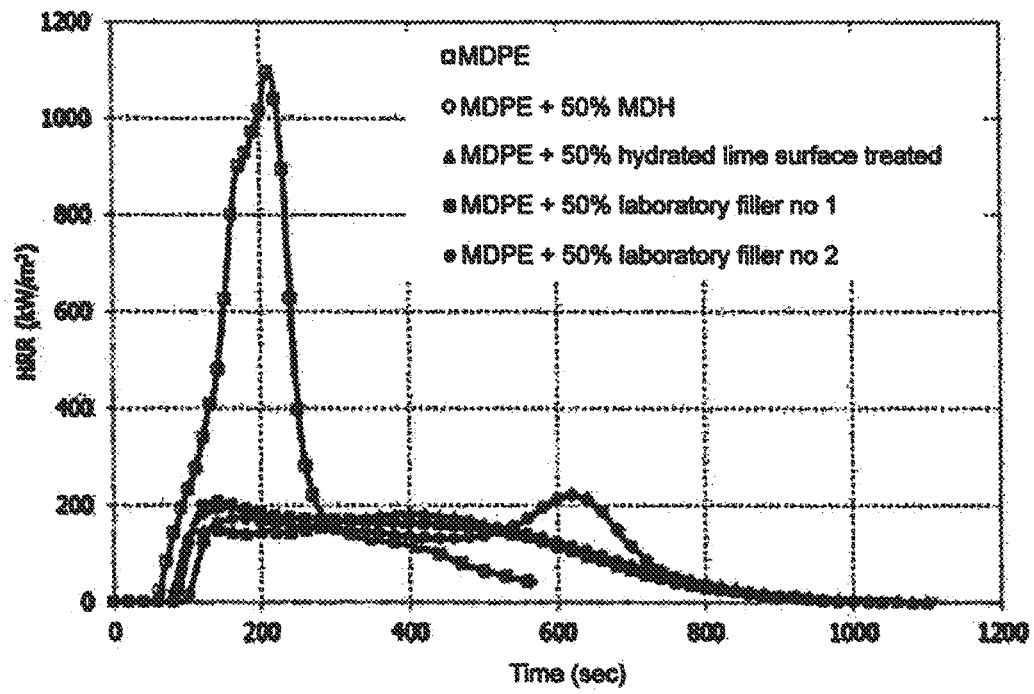
FIG. 8 is a graph illustrating the results of the fire test by means of cone calorimetry of the flame retardant polymer compositions according to the Examples 5 to 7.

The results recorded during measurements performed with the cone calorimeter are compared in FIG. 8 with those obtained for the host polymer that is unfilled (MDPE) and for the same polymer, filled under the same conditions and with the same proportions of MDH (whose main properties are provided in Table 2).

Once again, these results clearly indicate a net flame retardant effect for the hydrated lime in comparison to the unfilled polymer, an effect that is indeed very much comparable to that obtained with the MDH, in spite however, of there being a shorter ignition time period.

Figure 9A:
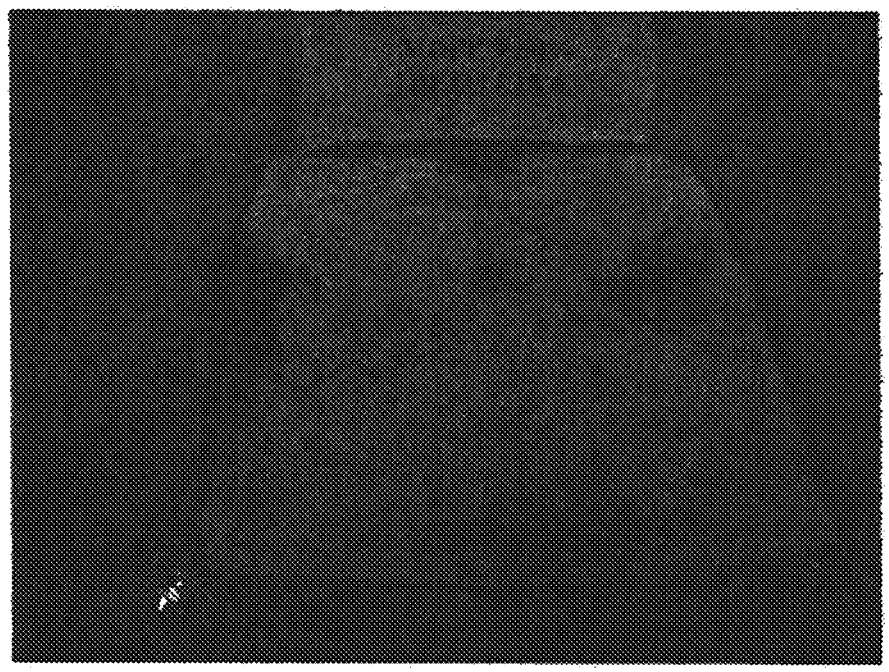
FIGS. 9A and 9B are photographs of the combustion residue of the flame retardant polymer composition according to the Example 5.
Figure 9B:
Figure 18A:
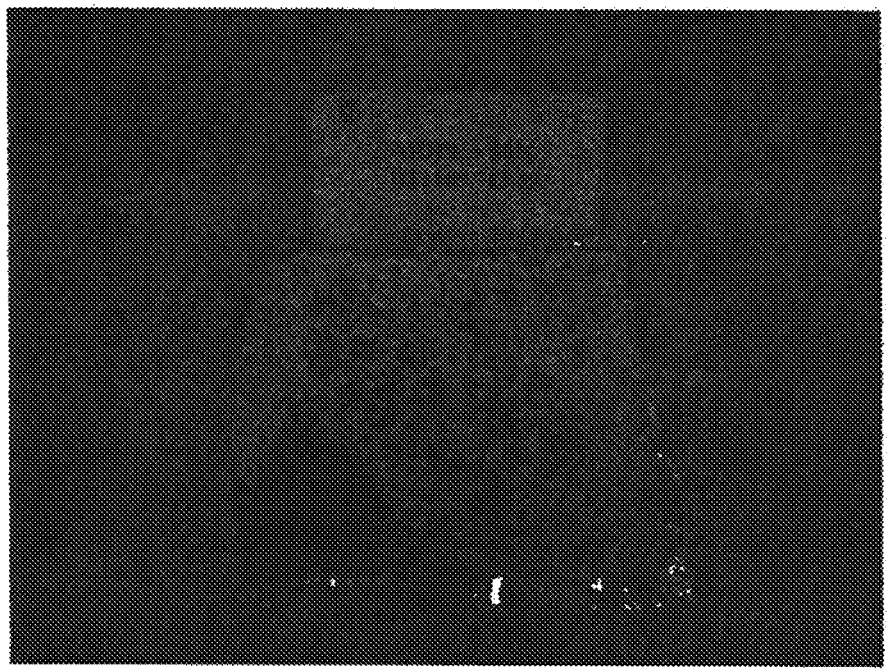
FIGS. 18A and 18B are photographs of the combustion residue of the flame retardant polymer composition according to the Comparative Example 3.
Figure 18B:
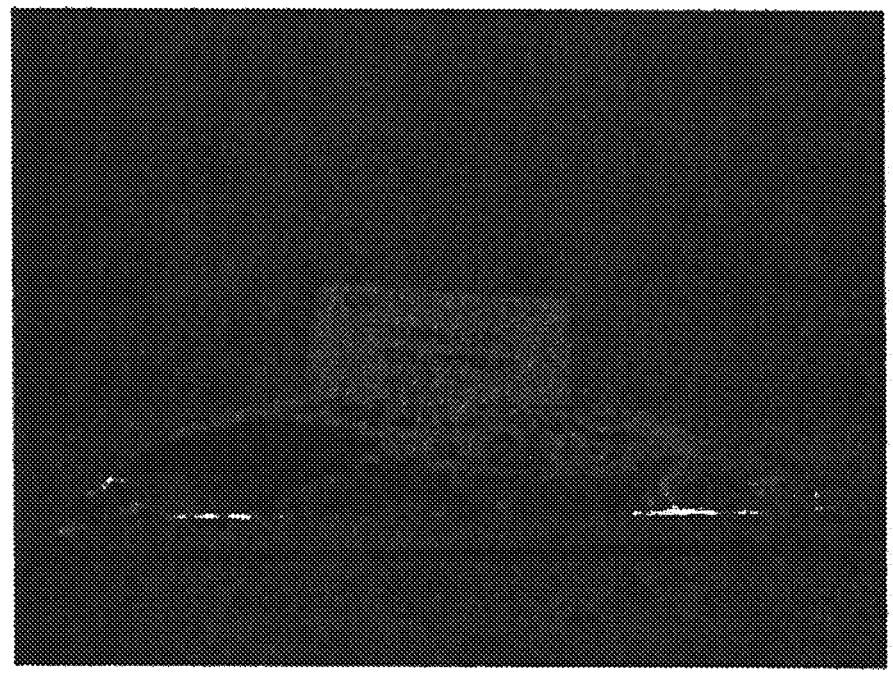

The observation of these combustion residues shown in the FIGS. 9A and 9B and characterised in Table 3 provides the data to conclude that upon conclusion of combustion thereof, the composition used in this example led to the formation of a cohesive residue: this residue is composed of a cohesive layer, unlike the residue obtained for a comparable composition of MDPE and MDH whereof the residue is similar to a powder or ash (FIGS. 18A and 18B). The residue includes one transverse crack and the crack is not deep. Despite this cracking, a sample of the cross section similar to a square with sides measuring about 30 mm can be withdrawn from the entire thickness of this residue. Moreover, the measurement of the mechanical strength of the residue resulted in an average value (based on measurements performed on three samples taken from different locations in the combustion residue) of 17 kPa, the three measured values being 11 kPa, 19 kPa and 20 kPa.

Example 6

Use as a Flame Retardant Filler of a Mineral Filler Consisting of Ca(OH)$_2$ and Mg(OH)$_2$ Tightly Bound in a MDPE Polymer Composition

In this example, the polymer matrix is MDPE as was the case in Example 5. However, unlike in the previous examples, the mineral filler was synthesised in the laboratory. The synthesis is carried out in a pilot hydrator, wherein quick lime is hydrated in the presence of Mg(OH)$_2$ that was obtained commercially in the form of an aqueous suspension containing 53% by weight of Mg(OH)$_2$. The flow rates for quicklime and for the suspension of Mg(OH)$_2$ are calculated in a manner so as to obtain, at the output of the hydrator, a product containing about 22% by weight of Mg(OH)$_2$ and the rest of the hydrated lime (about 73% Ca(OH)$_2$) with impurities and unburnt remnants. The suspension of Mg(OH)$_2$ is diluted, with the water introduced by the suspension into the hydrator being adjusted in a manner so as to have during the hydration reaction a moisture content of the product at the output of the hydrator of less than 4%. The hydration is carried out on a continuous basis. Given its low moisture content, the product that comes out of the hydrator does not require any drying step. However, its particle size is controlled. In order to do this, it goes through the same steps of particle size separation as those undergone by the grade A hydrated lime presented in the Example 1, in order to obtain a fine particle size grade that is suitable for the preparation of compositions as described in the invention. This filler presents a $d_{50}$ of 5.1 µm, a $d_{90}$ of 30.1 µm and a $d_{97}$ of 111.0 µm, as measured in accordance with the granulometry or particle size analysis method 1 described in the text and used for the determination of the values for the fillers presented in the Tables 1 and 2.

During the synthesis process, the Mg(OH)$_2$ does not undergo any change. As the Mg(OH)$_2$ is incorporated continuously over the course of the hydration reaction of the quicklime, this method provides the possibility of obtaining an intimate admixture of Mg(OH)$_2$ and Ca(OH)$_2$.

In the same manner as in Example 5, this filler is incorporated into the MDPE in an amount of up to 50% by weight and the compositions thus prepared are characterised, just as with the combustion residues.

The results of the fire tests by cone calorimetry are represented in FIG. 8 and is very much comparable to those obtained for the composition used in Example 5.

Figure 10:
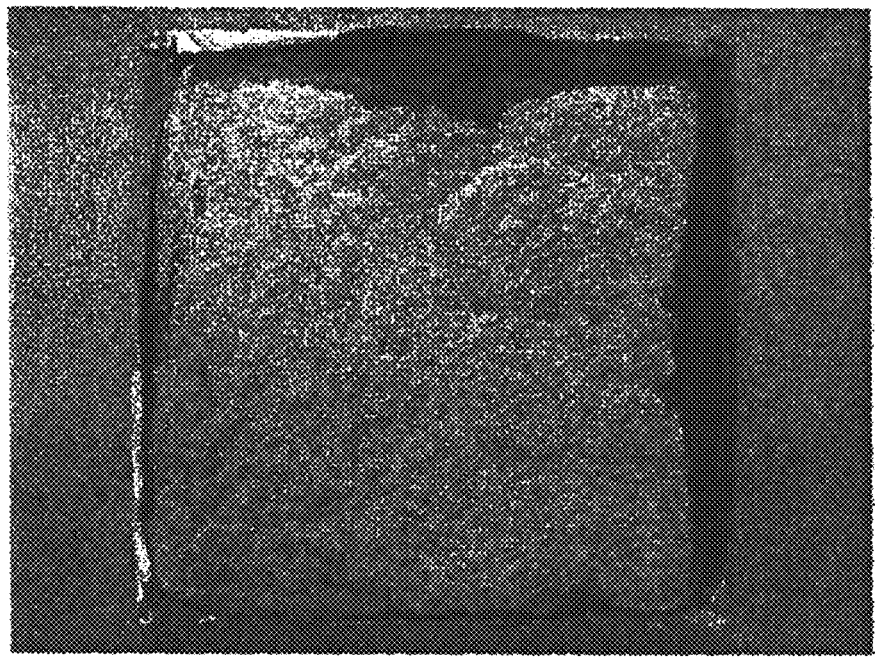
FIG. 10 is a photograph of the combustion residue of the flame retardant polymer composition according to the Example 6.

The observation of the combustion residue shown in FIG. 10 and characterised in Table 3 provides the data allowing it to be said that, upon conclusion of combustion thereof, the composition used in this example led to the formation of a cohesive residue in comparison to the residue obtained for a comparable composition based on MDPE and MDH (FIGS. 18A and 18B). This residue does not have any transverse cracks and nor any deep cracks.

Example 7

Use as a Flame Retardant Filler of a Mineral Filler, Consisting of Ca(OH)$_2$ and Mg(OH)$_2$ that are Tightly Bound, Surface-Treated in a MDPE Polymer Composition of

Example 7 is very much similar to Example 6, with the only real difference being that the laboratory filler no 1 is replaced by a laboratory filler no 2. This new laboratory filler is obtained by the same method as that described in Example 6, with the exception being that this time around, the calcium stearate is added into the suspension of Mg(OH)$_2$ which is used for hydration of the quicklime. The ratio of Ca/Mg is kept equivalent to that used in Example 6 (about 22% of Mg(OH)$_2$ in the final product, the remainder being Ca(OH)$_2$, CaCO$_3$ and impurities). The quantity of stearate is added in a manner so as to have about 4% of calcium stearate in relation to the weight of the mixed mineral filler based on Ca and Mg obtained at the conclusion of the synthesis. This filler presents a $d_{50}$ of 6.0 µm, a $d_{90}$ of 69.6 µm and a $d_{97}$ of 146.8 µm, as measured in accordance with the granulometry or particle size analysis method 1 described in the text and used for the determination of the values presented for the fillers in the Tables 1 and 2.

The addition of calcium stearate in situ during the reaction for the preparation of mixed Ca—Mg filler is aimed at promoting contact of the filler thus synthesised with the polymer matrices. As in Example 6, this filler is incorporated in a MDPE matrix.

The cone calorimetry results for this composition are illustrated in FIG. 8. Logically, the addition of calcium stearate to the filler does not in any way modify its fire retardant properties. The mechanical properties of the composition (breaking elongation, resilience), not shown here, have been improved in comparison with those of the composition used in Example 6, due to the addition of calcium stearate.

Figure 11:
FIG. 11 is a photograph of the combustion residue of the flame retardant polymer composition according to the Example 7.

The combustion residue is presented in FIG. 11. It is very much similar to that shown for the Example 6 in FIG. 10.

Example 8

Use as a Flame Retardant Filler of a Semi-Hydrated Dolomite of Fine Particle Size Grade in an EVA Polymer Composition The composition used in this example is comparable to that used in Example 1, but this time around, the mineral filler is not a hydrated lime, but a semi-hydrated dolomite. This dolomite filler is of a particle size grade that is comparable to the fine particle size grade, known as grade A, of the hydrated lime, or even finer still. The semi-hydrated dolomite of the composition of this example is presented in Table 1. The polymer matrix is EVA 328 as in the Example 1 and the content of filler in this matrix is 60% by weight.

Figure 12:
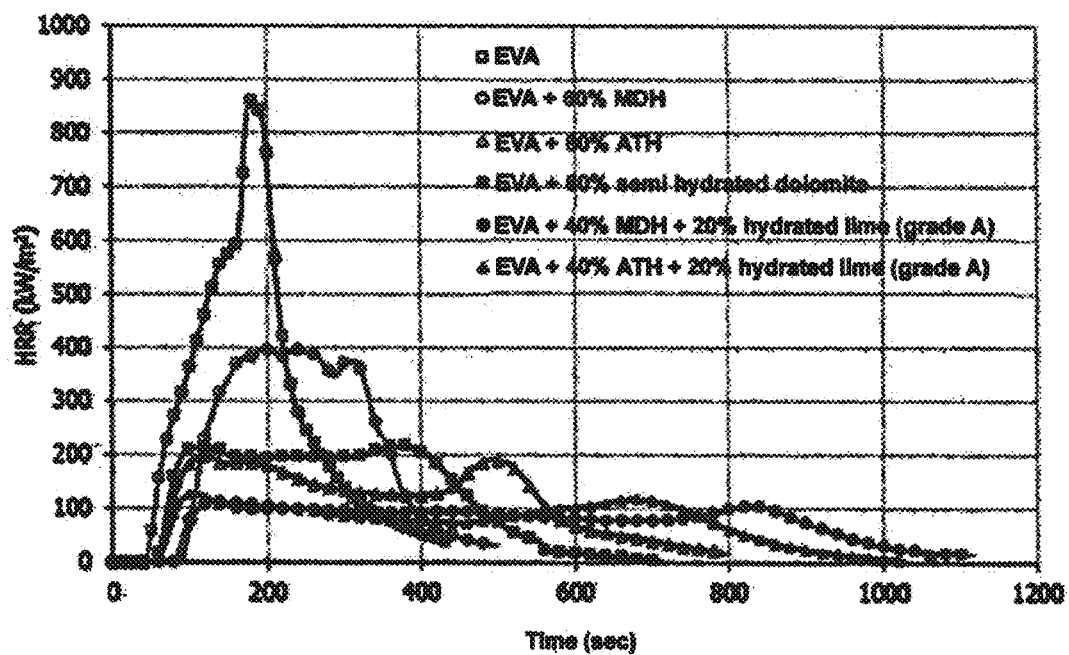
FIG. 12 is a graph illustrating the results of the fire test by means of cone calorimetry of the flame retardant polymer compositions according to the Examples 8 to 10.

The results of the fire tests by cone calorimetry are shown in FIG. 12 and are comparable to the results obtained for the composition used in Example 1.

Figure 13A:
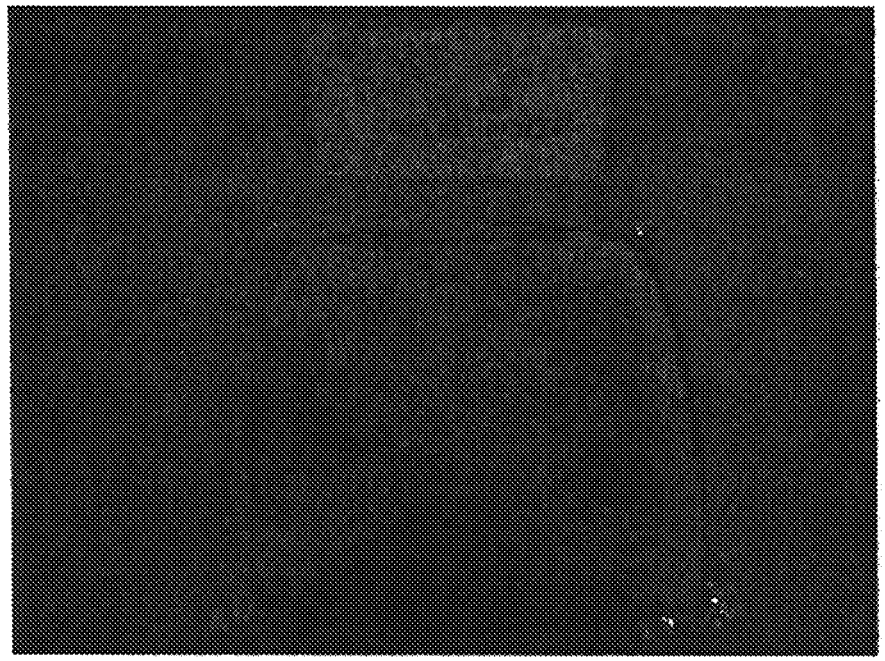
FIGS. 13A and 13B are photographs of the combustion residue of the flame retardant polymer composition according to the Example 8.
Figure 13B:
Figure 16A:
FIGS. 16A and 16B are photographs of the combustion residue of the flame retardant polymer composition according to the Comparative Example 1.
Figure 16B:
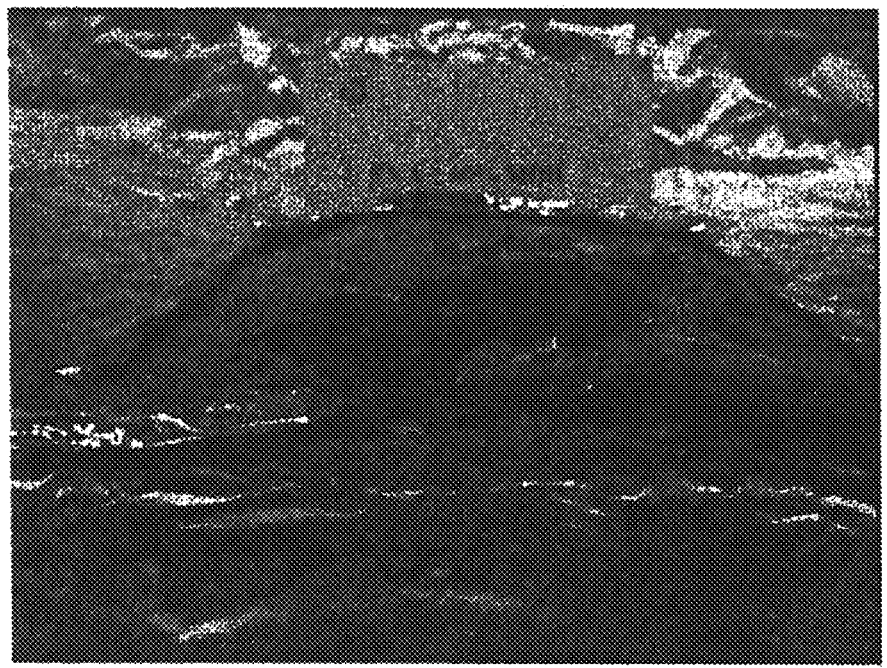
Figure 17A:
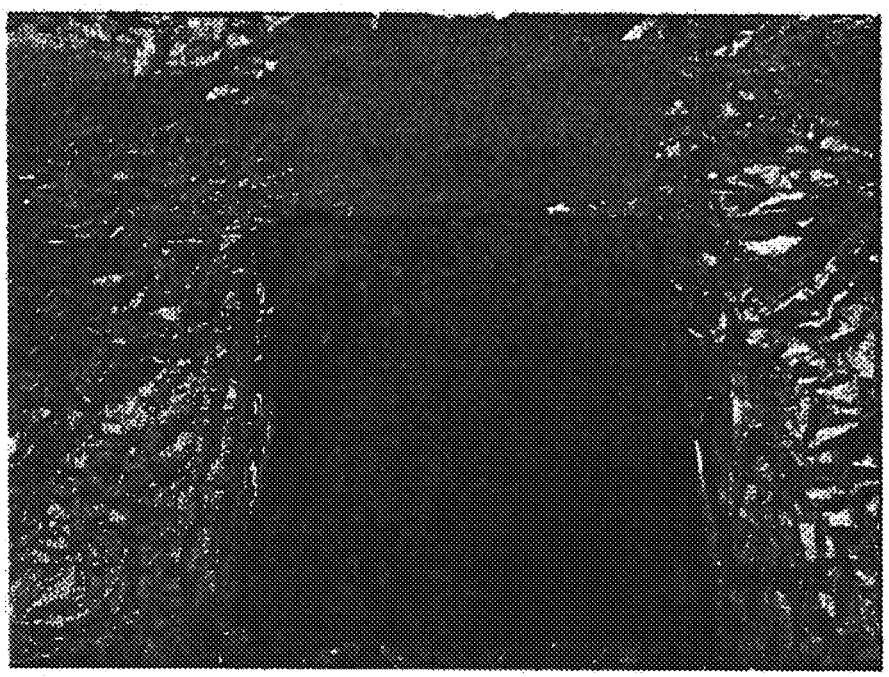
FIGS. 17A and 17B are photographs of the combustion residue of the flame retardant polymer composition according to the Comparative Example 2.
Figure 17B:

The observation of the combustion residues shown in the FIGS. 13A and 13B and characterised in Table 3 provides the data allowing it to be said that, upon conclusion of combustion thereof, the composition used in this example led to the formation of a cohesive residue in comparison to the residue obtained for the MDH based or ATH based compositions whereof the residues are similar to a powder or ash (FIGS. 16A and 16B in the case of MDH and FIGS. 17A and 17B in the case of ATH). The residue is in fact present in the form of a single layer and with no cracks, not even on the surface. Moreover, the measurement of the mechanical strength of the residue resulted in a high average value (based on measurements performed on three samples taken from different locations in the combustion residue) of 206 kPa, with the three measured values being 162 kPa, 195 kPa and 260 kPa. These results indicate that the presence of Mg in the mineral filler does not impair the fire resistance effect thereof.

Example 9

Use as a Flame Retardant Filler of a Mineral Filler Consisting of Hydrated Lime of Fine Particle Size Grade and MDH in an Admixture in an EVA Polymer Composition The composition used in this example is an EVA 328 based composition as in the Examples 1 to 3 and 8 here above, in which the mineral filler is a mixture of two powders. As in the previous examples based on EVA, the mineral filler is incorporated in an amount representing up to 60% of the total weight of the composition, but this filler is an admixture of 40% by weight of MDH (Magnifin H10-Albemarle described in Table 2) and 20% by weight of hydrated lime of particle size grade A as used in the majority of the examples provided here above and whose properties are detailed in Table 1, these percentages being expressed relative to the total weight of the composition. The mixing of these powders is carried out manually, prior to the introduction thereof into the gravimetric dosing device that provides the ability to control the level of mineral filler content in the composition at the time of preparation of the composition, which is done by following the method described in Example 1.

The results of the fire tests are compared to those obtained for the host polymer that is unfilled (EVA) and for the same polymer, filled under the same conditions and with 60% of MDH as in FIG. 12.

The results obtained in the cone calorimetry tests for this composition indicate that the mixture of 40% MDH+20% hydrated lime is a flame retardant that is very considerably better in EVA than the MDH alone. The HRR curve as a function of time is very significantly lower and spread out over time. This improvement is probably linked to the fact that $Mg(OH)_2$ and therefore the MDH is soluble in the acetic acid which is released during the combustion of the EVA of this composition, unlike the $Ca(OH)_2$ which is not soluble.

Figure 14A:
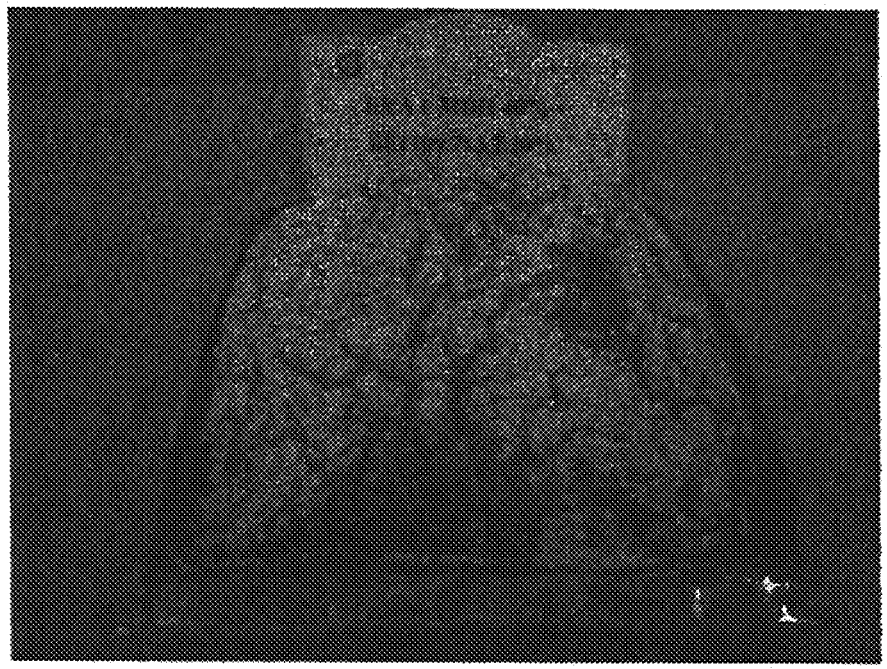
FIGS. 14A and 14B are photographs of the combustion residue of the flame retardant polymer composition according to the Example 9.
Figure 14B:

The observation of the combustion residues shown in the FIGS. 14A and 14B and characterised in the Table 3 makes it possible to conclude that following conclusion of the combustion thereof, the composition of this example led to the formation of a cohesive residue that is very different from the residue obtained for the EVA filled only with MDH (FIGS. 16A and 16B). In fact, the residue obtained for the composition of this example is not black and is presented in the form of a cohesive and inflated crust. Appearing on this residue are 1 to 2 transverse cracks which however, are not deep. The measurement of the mechanical strength of the residue resulted in an average value (based on measurements performed on three samples taken from different locations in the combustion residue) of 33 kPa, with the three measured values being 14 kPa, 33 kPa and 53 kPa. Whereas this value is not really high, it however, is quite significantly higher than in the case of a composition of EVA 328 based on 60% of MDH alone, for which it is not even possible to perform the measurement of the mechanical strength of the combustion residue, given that it is not possible to take any samples of a suitable size that would be sufficient for carrying out this measurement.

Example 10

Use as a Flame Retardant Filler of a Mineral Filler Consisting of Fine Particle Size Grade Hydrated Lime and ATH in an Admixture in an EVA Polymer Composition This example is similar to the Example 9 provided here above, the mineral filler incorporated into the EVA 328 still being a mixture of fillers. However, this time around, the MDH is replaced by ATH (Martinal OL 107 LEO-Albemarle), with the composition containing as a consequence thereof 40% by weight of ATH and 20% by weight of hydrated lime of particle size grade A, these percentages being as usual expressed in relation to the total weight of the composition. The main properties of the fillers that make up this mixture are given in Table 1 for the grade A hydrated lime and in Table 2 for the ATH.

As in Example 9, this mixture of fillers is incorporated into the EVA 328 and the compositions thus prepared are characterised, just as with the combustion residues.

FIG. 12 shows that this composition has a better flame retardant effect than that of the ATH alone.

Figure 15A:
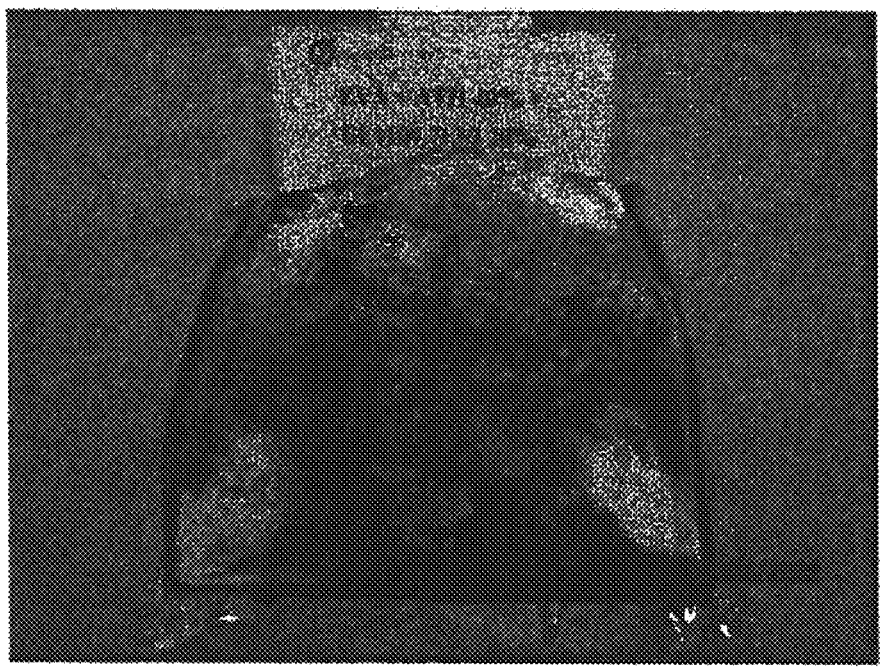
FIGS. 15A and 15B are photographs of the combustion residue of the flame retardant polymer composition according to the Example 10.
Figure 15B:

The observation of the combustion residues shown in the FIGS. 15A and 15B and characterised in the Table 3 makes it possible to conclude that following conclusion of the combustion thereof, the composition of this example led to the formation of a cohesive residue, unlike a composition of EVA 328 containing 60% of ATH only and which results in the formation of a powdery residue (FIGS. 17A and 17B). This cohesive residue is coloured a significantly darker black that most of the residues obtained for the compositions used in the other examples. The measurement of the mechanical strength of the residue resulted in an average value (based on measurements performed on three samples taken from different locations in the combustion residue) of 29 kPa, with the three measured values being 17 kPa, 34 kPa and 37 kPa.

Comparative Example 1

Use as a Flame Retardant Filler of MDH in an EVA 328 Polymer Composition

In this comparative example, the polymer matrix is EVA 328, as is also the case in the Examples 1 to 3 and 8 to 10 provided here above. This time around, the matrix is filled, by following the method described in the Example 1, with 60% by weight of MDH (Magnifin H 10-Albemarle) whose main properties are presented in Table 2.

The residue obtained with this composition after conclusion of the cone calorimetry test is completely black and has no cohesiveness as is shown in the FIGS. 16A and 16B. It is presented in the form of an ash. In addition, it is not possible to apply the measurement of mechanical strength as described in the text and in the FIG. 1, to this residue, given that it is not possible to take any samples of a suitable size that would be sufficient for carrying out this measurement.

Comparative Example 2

Use as a Flame Retardant Filler of ATH in an EVA 328 Polymer Composition

This comparative example is similar to Comparative Example 1, however with the replacement of the 60% of MDH by 60% of ATH (Martinal OL 107 LEO-Albemarle, Table 2) in the EVA 328 matrix.

As in the Comparative Example 1, the residue obtained with this composition after conclusion of the cone calorimetry test has no cohesiveness as is shown in the FIGS. 17A and 17B. It is presented in the form of an ash. In addition, it is not possible to apply the measurement of mechanical strength as described in the text and in the FIG. 1, to this residue, given that it is not possible to take any samples of a suitable size that would be sufficient for carrying out this measurement.

Comparative Example 3

Use as a Flame Retardant Filler of MDH in a Polymer Composition of MDPE

In this comparative example, the polymer matrix is the same MDPE (medium density polyethylene) as in Example 5 provided here above. This time around, this matrix is filled, by following the method described in Example 5, with 50% by weight of MDH (Magnifin H10-Albemarle) whose main properties are presented in Table 2.

The residue obtained with this composition after conclusion of the cone calorimetry test is shown in the FIGS. 18A and 18B. It has no has no cohesiveness and is presented in the form of an ash. In addition, it is not possible to apply the measurement of mechanical strength as described in the text and in the FIG. 1, to this residue, given that it is not possible to take any samples of a suitable size that would be sufficient for carrying out this measurement.

Comparative Example 4

Figure 19A:
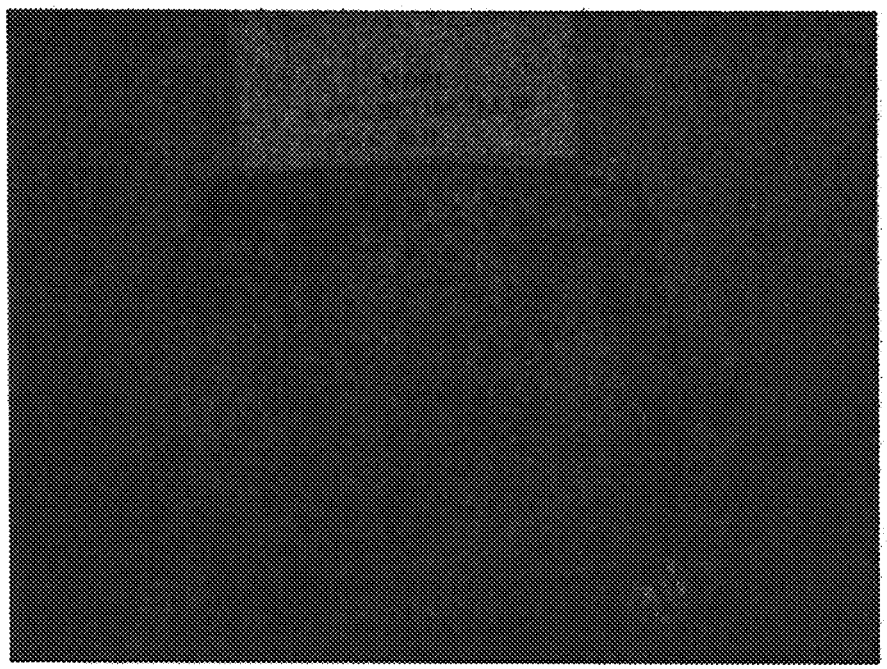
FIGS. 19A and 19B are photographs of the combustion residue of the flame retardant polymer composition according to the Comparative Example 4.
Figure 19B:
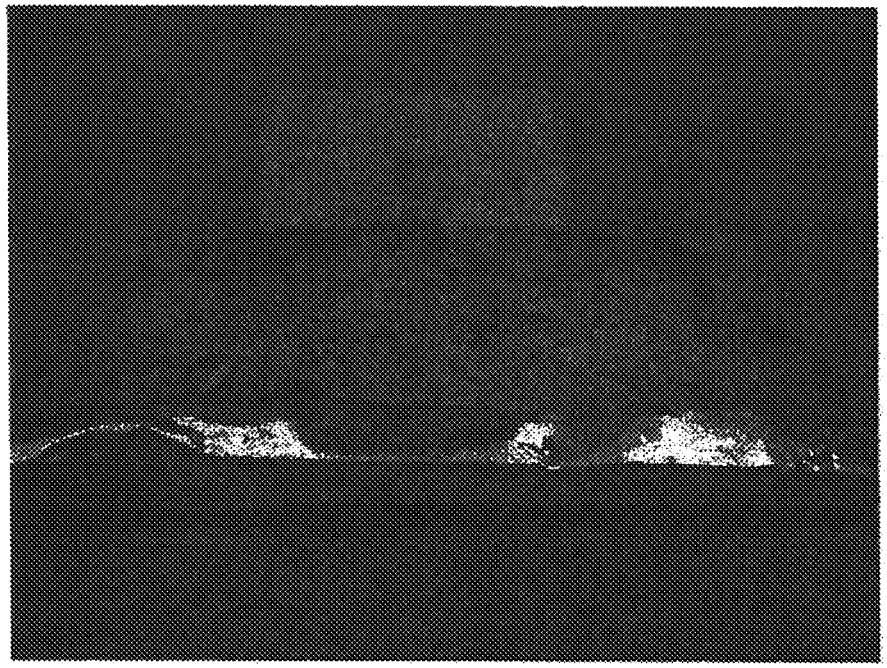

Use as Flame Retardant Filler of MDH in a Polymer Composition of MDPE, in the Presence of a Ceramising Agent This comparative example is similar to Comparative Example 3, but this time around, the 50% of MDH is replaced by a mixture composed of 45% of MDH and 5% of a clay, more precisely, modified montmorillonite clay (Cloisite 30B, Rockwood Specialties Inc), these percentages being expressed in relation to the total weight of the composition. Nanoclays, in particular this Cloisite, are known to allow for the formation of a cohesive residue by means of a synergistic effect between these fillers and the flame retardant additives (here MDH). This ceramising effect is validated in EVA 328, or a composition of EVA 328 containing 55% of MDH and 5% of Cloisite resulting following conclusion of the combustion in a very cohesive residue (not illustrated here). In contrast, in the MDPE, the substitution of a part of the MDH by Cloisite appears to be without any effect, the combustion residue presented in the FIGS. 19A and 19B and corresponding to the composition with the Cloisite being completely identical to the combustion residue obtained for the same matrix filled with the same MDH but without Cloisite (FIGS. 18A and 18B).

Comparative Example 5

Use as a Flame Retardant Filler of MDH in a Polystyrene Polymer Composition

In this comparative example, the polymer matrix is the same polystyrene as in the Example 4 provided here above. This time around, the matrix is filled with 50% by weight of MDH (Magnifin H10-Albemarle) whose main properties are presented in Table 2.

Figure 20A:
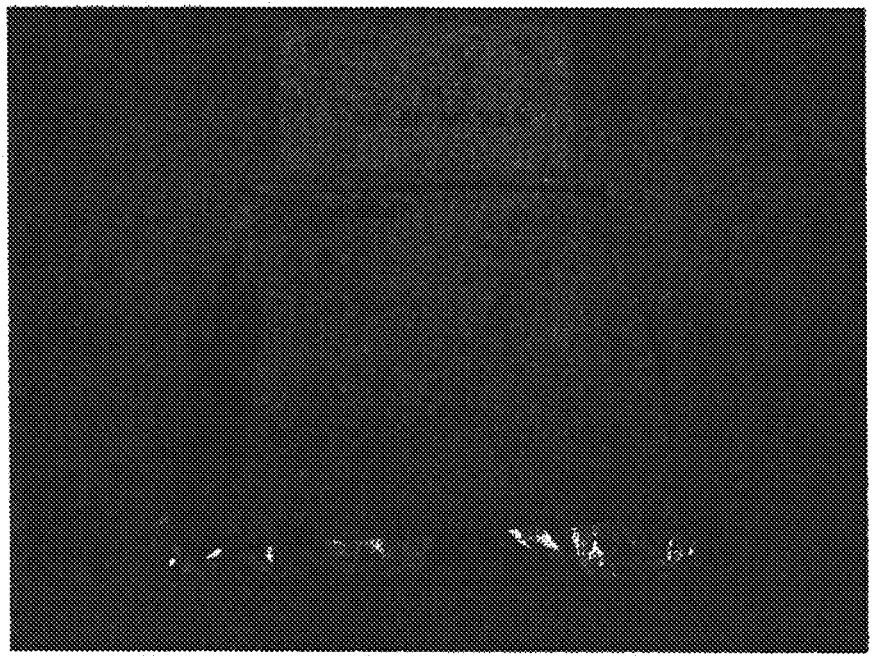
FIGS. 20A and 20B are photographs of the residue of combustion of the flame retardant polymer composition according to the Comparative Example 5.
Figure 20B:
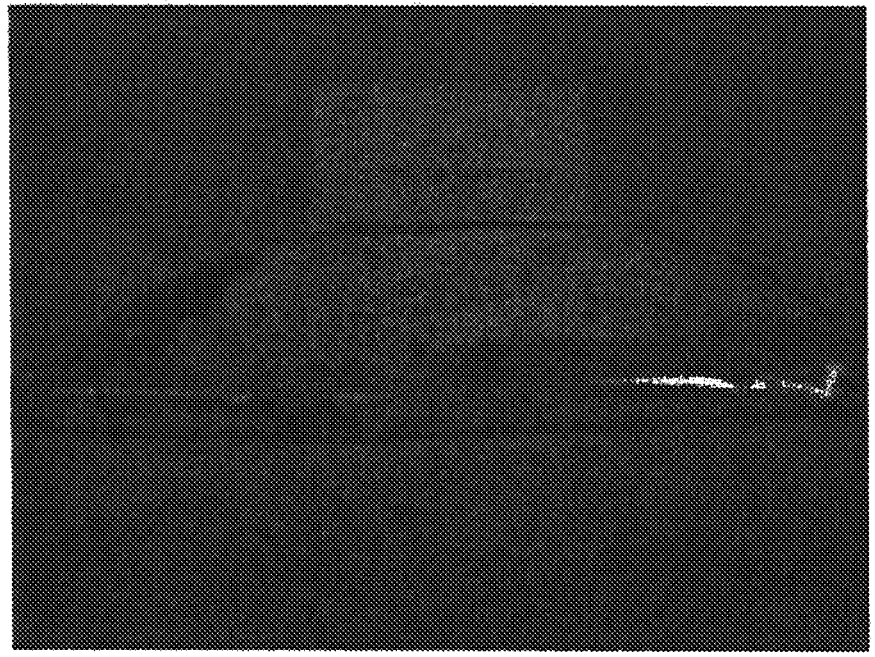

The residue obtained with this composition after conclusion of the cone calorimetry test is shown in the FIGS. 20A and 20B. It has no cohesiveness and is presented in the form of an ash. In addition, it is not possible to apply the measurement of mechanical strength as described in the text and in the FIG. 1, to this residue, given that it is not possible to take any samples of a suitable size that would be sufficient for carrying out this measurement.

Comparative Example 6

Use as a Flame Retardant Filler of ATH in a Polystyrene Polymer Composition

This comparative example is similar to the Comparative Example 5, however with the replacement of the 50% of MDH by 50% of ATH (Martinal OL 107 LEO-Albemarle, Table 2) in the PS matrix.

Figure 21A:
FIGS. 21A and 21B are photographs of the combustion residue of the flame retardant polymer composition according to the Comparative Example 6.
Figure 21B:
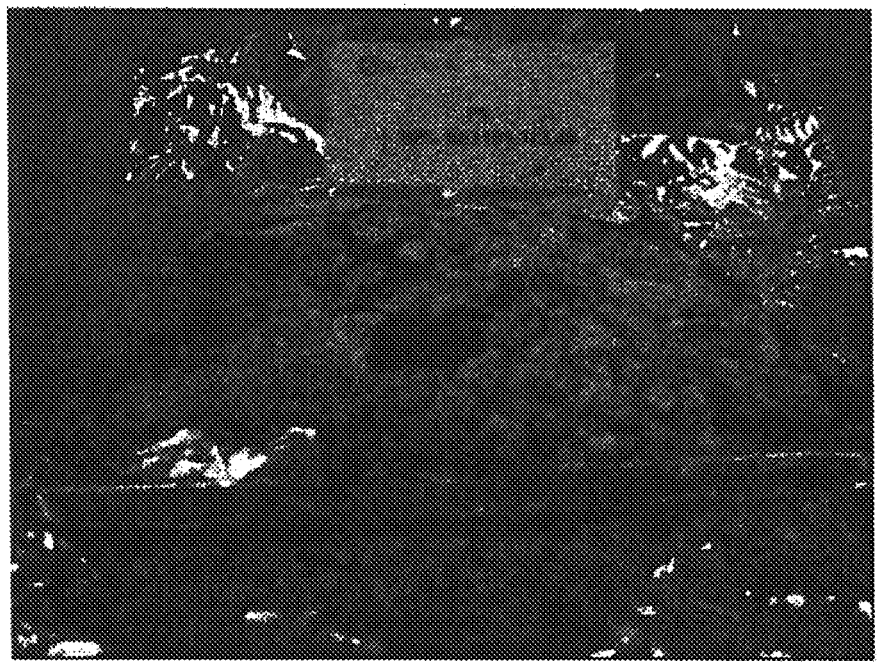

As in the Comparative Example 1, the residue obtained with this composition after conclusion of the cone calorimetry test has no cohesiveness as is shown in the FIGS. 21A and 21B. It is presented in the form of an ash. In addition, it is not possible to apply the measurement of mechanical strength as described in the text and in the FIG. 1, to this residue, given that it is not possible to take any samples of a suitable size that would be sufficient for carrying out this measurement.

TABLE 1

|  | Standard Grade A Hydrated Lime (Ex 1, 4, 9 and 10) | Standard Grade B Hydrated Lime (Ex 2) | Hydrated Lime having low specific surface area (Ex 3) | Semi Hydrated Dolomite (Ex 8) |
|---|---|---|---|---|
| $Ca(OH)_2$ (% by weight) | 92.8 | 94.3 | 96.4 | 55.3 |
| $CaCO_3$ (% by weight) | 5.9 | 4.2 | 1.5 | 4.8 |
| $Mg(OH)_2$ [1] (% by weight) | — | — | — | 11.1 |
| $MgO$ [1] (% by weight) | — | — | — | 24.6 |
| $CaO$ (% by weight) | 0.02 | 0.13 | 0.20 | 1.8 |
| Ca/Mg (mol) | — | — | — | — |
| Sum of impurities [2] (% by weight) | 1.26 | 1.37 | 1.68 | 2.45 |
| $Fe_2O_3$ (% by weight) | 0.13 | 0.19 | 0.24 | 0.45 |
| Moisture 150° C. (% by weight) 50 | 0.7 | 1.1 | 0.5 | 0.8 |
| Surface BET ($m^2/g$) | 14.8 | 15.8 | 7.5 | 11.3 |
| Particle size (Granulometry) 1 [3] | | | | |
| $d_3$ (µm) | 0.8 | 0.8 | 0.8 | 0.6 |
| $d_{10}$ (µm) | 1.2 | 1.5 | 1.7 | 1.1 |
| $d_{50}$ (µm) | 2.9 | 5.1 | 7.4 | 3.2 |
| $d_{90}$ (µm) | 6.2 | 39.8 | 99.7 | 7.4 |
| $d_{97}$ (µm) | 33.0 | 92.1 | 161.2 | 9.8 |
| $d_{100}$ (µm) | 309.6 | 309.6 | 309.6 | 76.4 |
| Particle size (Granulometry) 2 [4] | | | | |
| $d_3$ (µm) | 0.7 | 0.7 | 0.7 | 0.5 |
| $d_{10}$ (µm) | 1.1 | 1.3 | 1.1 | 0.9 |
| $d_{50}$ (µm) | 3.2 | 3.9 | 3.5 | 2.7 |
| $d_{90}$ (µm) | 8.9 | 9.8 | 8.9 | 6.2 |
| $d_{97}$ (µm) | 14.3 | 17.2 | 11.2 | 7.4 |
| $d_{100}$ (µm) | 39.8 | 43.7 | 43.7 | 11.8 |
| Temp of decomposition $Mg(OH)_2$ (° C.) [1] | — | — | — | 250-420 |
| Temp of decomposition $Ca(OH)_2$ (° C.) | 400-550 | 400-580 | 400-610 | 420-580 |
| T 95% (° C.) | 455 | 470 | 477 | 443 |

[1] Applicable only for dolomites
[2] $MgO + SiO_2 + Al_2O_3 + Fe_2O_3 + MnO + P_2O_5 + K_2O + SO_3$ for the limes, $SiO_2 + Al_2O_3 + Fe_2O_3 + MnO + P_2O_5 + K_2O + SO_3$ in the case of dolomites
[3] Measurement of the size of the agglomerates by means of laser granulometry on the non disagglomerated powder
[4] Measurement of the size of the aggregates by means of laser granulometry on the disagglomerated powder by ultrasound

TABLE 2

|  | ATH (Example 10, and Comparative Examples 2 and 6) | MDH (Example 9, and Comparative Examples 1 and 3 to 5) |
|---|---|---|
| $Al(OH)_3$ (% by weight) | 99.8 | — |
| $Mg(OH)_2$ [1] (% by weight) | — | 100.0 |
| Sum of impurities [1] (% by weight) | 0.19 | 0.03 |
| Surface BET ($m^2/g$) | 5.3 | 9.5 |
| Porous Volume ($cm^3/g$) | 0.017 | 0.029 |
| Particle size (Granulometry) 1 [2] | | |
| $d_3$ (µm) | 0.6 | 0.5 |
| $d_{10}$ (µm) | 0.9 | 0.7 |
| $d_{50}$ (µm) | 1.8 | 1.7 |
| $d_{90}$ (µm) | 3.5 | 25.0 |
| $d_{97}$ (µm) | 4.4 | 52.6 |
| $d_{100}$ (µm) | 7.4 | 83.9 |
| Particle size (Granulometry) 2 [3] | | |
| $d_3$ (µm) | 0.7 | 0.4 |
| $d_{10}$ (µm) | 1.0 | 0.6 |
| $d_{50}$ (µm) | 2.0 | 1.1 |
| $d_{90}$ (µm) | 3.5 | 1.7 |
| $d_{97}$ (µm) | 4.2 | 2.0 |
| $d_{100}$ (µm) | 6.8 | 2.9 |
| Temp of decomposition hydroxide (° C.) | 210-550 | 340-550 |
| T 95% (° C.) | 301 | 413 |

[1] $SiO_2 + CaO + Fe_2O_3 + Na_2O + SO_3 + Cl$
[2] Measurement of the size of the agglomerates by means of laser granulometry on the non disagglomerated powder
[3] Measurement of the size of the aggregates by means of laser granulometry on the disagglomerated powder by ultrasound

TABLE 3

| Example No | 1 | 2 | 3 | 4 | 5 | 6 | 7 | 8 | 9 | 10 |
|---|---|---|---|---|---|---|---|---|---|---|
| Number of transverse cracks | 0 | 0 | 0 | 2 | 1 | 0 | 0 | 0 | 1-2 | 0 |
| Deep Cracks | — | — | — | yes | no | — | — | — | no | — |
| Maximum size of a sample (mm) [1] | — | — | — | 30 | 30 | — | — | — | — | — |
| Average Mechanical Strength kPa) | 125 | 134 | 32 | 98 | 17 | NA | NA | 206 | 33 | 29 |

TABLE 3-continued

| Example No | 1 | 2 | 3 | 4 | 5 | 6 | 7 | 8 | 9 | 10 |
|---|---|---|---|---|---|---|---|---|---|---|
| Minimum Mechanical Strength kPa) | 111 | 120 | 26 | 87 | 11 | NA | NA | 162 | 14 | 17 |
| Maximum Mechanical Strength kPa) | 143 | 157 | 37 | 123 | 20 | NA | NA | 280 | 53 | 37 |

[1] Maximum size of the sample (the sample making up the entire thickness of the residue and whose cross section is similar to a square) which may be taken without being broken in the residue obtained at the conclusion of the cone calorimeter test, which has sides measuring 100 mm.
NA: The compressive mechanical strength of the combustion residues was not measured (not available)

The invention claimed is:

1. A mineral filler in a flame retardant and fire resistant organic polymer composition comprising a calcium compound containing at least calcium hydroxide particles as a fire resistant additive of the polymer composition, wherein the calcium hydroxide particles have a particle size $d_{10}$ comprised between 0.9 μm and 1.1 μm and $d_{90}$ comprised between 6.2 μm and 9.8 μm, said particle sizes being measured by means of laser granulometry after dispersion in methanol and after deagglomeration of the filler by means of ultrasound.

2. A mineral filler according to claim 1, wherein the said calcium hydroxide is hydrated lime also known as slaked lime, in powdery form.

3. A mineral filler according to claim 1, comprising at least one magnesium compound, in the form of a magnesium hydroxide as a flame retardant additive.

4. A mineral filler according to claim 3, wherein the calcium compound and the magnesium compound are two separate compounds in a mixture.

5. A mineral filler according to claim 3, wherein the calcium compound and the magnesium compound of the said mineral filler of the flame retardant polymer composition are tightly bound and derived from a slaking of quicklime with a suspension of magnesium hydroxide.

6. A mineral filler according to claim 3 wherein the calcium compound and magnesium compound are tightly bound and derived from a total or partial slaking of dolomite lime.

7. A mineral filler according to claim 6, wherein the said calcium compound and the said magnesium compound that are tightly bound form a semi hydrated dolomite having the general formula $aCaCO_3.bCa(OH)_2.cMg(OH)_2.dMgO.eCaO$, a,b,c,d and e being mole fractions with $(a+b+e)/(c+d)$ being comprised between 0.8 and 1.2, and having values such that:
  b represents the mole fraction corresponding to a proportion by weight that is greater than or equal to 15% and less than or equal to 69%,
  c represents the mole fraction corresponding to a proportion by weight that is greater than or equal to 1%,
  d represents the mole fraction corresponding to a proportion by weight that is greater than or equal to 1% and generally less than 41%,
  a represents the mole fraction corresponding to a proportion by weight that is greater than or equal to 0%,
  e represents the mole fraction corresponding to a proportion by weight that is greater than or equal to 0%.

8. A mineral filler according to claim 7, wherein the said semi-hydrated dolomite comprises agglomerates of aggregates of particles.

9. A mineral filler according to claim 6, wherein the said calcium compound and the said magnesium compound that are tightly bound form a fully hydrated dolomite having the general formula $aCaCO_3.bCa(OH)_2.cMg(OH)_2.dMgO.eCaO$, a,b,c,d and e being mole fractions with $(a+b+e)/(c+d)$ being comprised between 0.8 and 1.2, and having values such that:
  b represents the mole fraction corresponding to a proportion by weight of 45% to 57%,
  c represents the mole fraction corresponding to a proportion by weight of 35% to 42%
  d represents the mole fraction corresponding to a proportion by weight of 0% to 2%,
  a represents the mole fraction corresponding to a proportion by weight that is greater than or equal to 0%,
  e represents the mole fraction corresponding to a proportion by weight of 0% to 3%.

10. A mineral filler according to claim 9, wherein the said fully hydrated dolomite comprises agglomerates of aggregates of particles.

11. A mineral filler according to claim 9 wherein the said hydrated dolomite is in powdery form and have particles whereof the size is less than 1 mm.

12. A method for manufacturing a flame retardant polymer composition comprising the following steps of:
  a) mixing of at least two granular polymers in order to form a first mixture of granular polymers, in the dry state in a first mixing vessel ;
  b) feeding of the said granular mixture into a blending vessel ;
  e) feeding of at least one mineral filler according to claim 1, into the said blending vessel accompanied by the formation of a second mixture ;
  d) melting of the said second mixture in order to form the said flame retardant polymer composition in the molten state, and feeding of the said flame retardant polymer composition in the molten state through an extrusion die in order to form wires of extrudated flame retardant polymer composition; and
  e) cutting of the said wires of extrudated flame retardant polymer composition according to a predetermined size in order to form solid granules of flame retardant polymer composition.

13. A manufacturing method according to claim 12, wherein at least one of the said at least two polymers is selected from the group consisting of polyethylenes, polypropylenes, polystyrenes, copolymers of ethylene and propylene (EPR), terpolymers of ethylene-propylene-diene-monomer (EPDM), copolymers of ethylene and vinyl acetate (EVA) having low/medium acetate content, copolymers of ethylene and methyl acrylate (EMA) having low/medium acrylate content, copolymers of ethylene and ethyl acrylate (EEA) having low acrylate content, copolymers of ethylene and butyl acrylate (ESA) having low acrylate content, copolymers of ethylene and octane, ethylene based polymers, polypropylene based polymers, polystyrene based polymers, halogenated polymers, or any mixture of these compounds.

14. A method according to claim 12, wherein the mineral filler is incorporated into the flame retardant polymer composition in an amount of 1% to 80% by weight, advantageously from 40% to 75% by weight, in relation to the total weight of the said flame retardant polymer composition.

15. A polymer sheath for electrical cables characterised in that it contains as a fire resistance additive the mineral filler of claim 1.

16. A polymer sheath according to claim 15, wherein the said flame retardant organic polymer composition comprises a thermoplastic, thermosetting or elastomer type of polymer of natural or synthetic origin.

17. A polymer sheath according to claim 16, wherein the said organic polymer is selected from the group consisting of polyethylenes, polypropylenes, polystyrenes, copolymers of ethylene and propylene (EPR), terpolymers of ethylene-propylene-diene-monomer (EPDM), copolymers of ethylene and vinyl acetate (EVA) having low/medium acetate content, copolymers of ethylene and methyl acrylate (EMA) having low/medium acrylate content, copolymers of ethylene and ethyl acrylate (EEA) having low acrylate content, copolymers of ethylene and butyl acrylate (ESA) having low acrylate content, copolymers of ethylene and octane, ethylene based polymers, polypropylene based polymers, polystyrene based polymers, halogenated polymers, or any mixture of these compounds.

* * * * *